(12) United States Patent
Matsubara et al.

(10) Patent No.: US 11,168,641 B2
(45) Date of Patent: *Nov. 9, 2021

(54) DIESEL ENGINE SYSTEM

(71) Applicant: Mazda Motor Corporation, Hiroshima (JP)

(72) Inventors: Takeshi Matsubara, Hiroshima (JP); Naotoshi Shirahashi, Hiroshima (JP); Takeru Matsuo, Higashihiroshima (JP); Sangkyu Kim, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/010,124

(22) Filed: Sep. 2, 2020

(65) Prior Publication Data

US 2021/0071615 A1 Mar. 11, 2021

(30) Foreign Application Priority Data

Sep. 10, 2019 (JP) .............................. JP2019-164682

(51) Int. Cl.
*F02D 41/40* (2006.01)
*F02B 3/06* (2006.01)
*F02D 41/38* (2006.01)

(52) U.S. Cl.
CPC .............. *F02D 41/402* (2013.01); *F02B 3/06* (2013.01); *F02B 2275/14* (2013.01); *F02D 2041/389* (2013.01); *F02D 2200/0406* (2013.01); *F02D 2200/101* (2013.01)

(58) Field of Classification Search
CPC .. F02D 41/40; F02D 41/402; F02D 2041/389; F02D 2200/0406; F02D 2200/101; F02B 3/06; F02B 23/0651; F02B 23/0696; F02B 2023/203; F02B 2275/14
See application file for complete search history.

(56) References Cited

U.S. PATENT DOCUMENTS

2012/0216775 A1* 8/2012 Iwai ..................... F02D 41/402
123/305
2012/0323468 A1 12/2012 Miyaura et al.
(Continued)

FOREIGN PATENT DOCUMENTS

JP 2011190725 A 9/2011

*Primary Examiner* — John Kwon
*Assistant Examiner* — Johnny H Hoang
(74) *Attorney, Agent, or Firm* — Alleman Hall Creasman & Tuttle LLP

(57) ABSTRACT

A diesel engine system has a piston in which a cavity is formed in a crown surface. The cavity has a bottom part, a peripheral part dented so as to be convex radially outward in a cross-sectional view, and a lip part formed above the peripheral part and protruding so as to be convex radially inward in the cross-sectional view. An injection controller causes an injector to perform, during operation in a given operating range, a main injection in which injected fuel is directed to the lip part, and an after-injection in which a smaller amount of fuel than the main injection is injected at a given period later than the main injection in an expansion stroke. An injection interval period that is a period of time from an end of the main injection to a start of the after-injection is shorter as an injection pressure of fuel increases.

10 Claims, 12 Drawing Sheets

(56) References Cited

U.S. PATENT DOCUMENTS

| | | | |
|---|---|---|---|
| 2014/0283785 A1* | 9/2014 | Takahashi | F02D 41/3011 |
| | | | 123/350 |
| 2016/0115895 A1* | 4/2016 | Ochi | F02D 41/3017 |
| | | | 123/305 |
| 2017/0159549 A1* | 6/2017 | Uehara | F02B 23/0672 |
| 2018/0340488 A1 | 11/2018 | Fukuda et al. | |
| 2020/0200135 A1* | 6/2020 | Kim | F02M 61/1813 |

* cited by examiner

DIESEL ENGINE SYSTEM

TECHNICAL FIELD

The present disclosure relates to a diesel engine system provided with a cylinder, a piston reciprocatably accommodated in the cylinder, and an injector which injects fuel containing diesel fuel into a combustion chamber which is a space above the piston.

BACKGROUND OF THE DISCLOSURE

JP2011-190725A is known as one example of a diesel engine. In the diesel engine disclosed in JP2011-190725A, injection patterns in which a pre-injection and an after-injection are combined with a main injection are defined in different modes for different operating conditions, and an injection timing and an injection period are adjusted based on a detection value of a pressure sensor which detects a fuel pressure inside an injector during a fuel injection according to the injection pattern.

For example, in the injection pattern including the main injection and the after-injection, a pressure pulsation caused by the fuel injection is detected by the pressure sensor, and based on the detected pressure pulsation, an interval from the main injection to the after-injection (injection interval) is adjusted. Therefore, since the effect of the fuel pressure pulsation to the after-injection is reduced, an adjustment accuracy of the injection amount of the after-injection can be improved.

Here, if the interval from the main injection to the after-injection is excessively shortened, since fuel of the after-injection is superposingly supplied into combustion gas based on the main injection, soot tends to be produced as a result of the fuel of the after-injection combusting in the environment of insufficient oxygen. Thus, in order to certainly avoid the generation of soot, it is possible to fully lengthen the interval from the main injection to the after-injection. However, if the interval becomes excessively long, since a ratio of energy used as work to the combustion energy based on the after-injection decreases, fuel efficiency is lowered.

In order to avoid both the generation of soot and the deterioration in fuel efficiency from becoming apparent, it is desirable to set the timing of the after-injection earliest possible in a period during which sufficient air (oxygen) can be used. However, the timing of the after-injection which can meet such a requirement changes each time according to a combustion state of fuel injected in advance by the main injection. Thus, it is proposed that properties which influence the combustion based on the main injection are obtained, and based on the properties, the suitable timing of the after-injection is determined each time.

However, the diesel engine disclosed in JP2011-190725A is not capable of realizing the above proposals. That is, in the art of JP2011-190725A, although there is room for correction by the pressure pulsation, the interval from the main injection to the after-injection is determined based on an injection pattern which is fundamentally defined beforehand for every engine operating condition. In other words, the timing of the after-injection is determined based on the basic interval which is experimentally defined beforehand. Therefore, it is impossible for the art of JP2011-190725A to determine the optimal timing of the after-injection according to the condition of the engine which changes every moment.

SUMMARY OF THE DISCLOSURE

The present disclosure is made in view of the above situations, and one purpose thereof is to provide a diesel engine system, capable of fully reducing generation of soot by increasing an air utilization factor of fuel injected by an after-injection while maintaining an appropriate fuel efficiency.

According to one aspect of the present disclosure, a diesel engine system is provided, which includes a cylinder, a piston reciprocatably accommodated in the cylinder, an injector configured to inject fuel containing diesel fuel into a combustion chamber that is a space above the piston, an injection pressure acquirer configured to acquire an injection pressure of the fuel injected from the injector, and an injection controller configured to control the injector so that the fuel is injected at a plurality of timings set from a compression stroke to an expansion stroke, during operation of the engine system in a given operating range. The piston has a cavity dented downwardly in a crown surface thereof, the cavity having, as wall surfaces defining the cavity, a bottom part formed so that a height thereof becomes lower while extending radially outward, a curved peripheral part formed radially outward of the bottom part and dented so as to be convex radially outward in a cross-sectional view including a cylinder axis, and a curved lip part formed above the peripheral part and protruding so as to be convex radially inward in the cross-sectional view. The injector is provided so as to inject the fuel obliquely downward and radially outward from a location of a ceiling part of the combustion chamber opposing to a center part of the cavity. The injection controller causes the injector to perform, during operation in the given operating range, a main injection in which a largest ratio of the fuel out of a total injection amount of the fuel in one combustion cycle is injected, the injected fuel being directed to the lip part to change a direction of at least a portion of the fuel to be downward from the lip part, and an after-injection in which a smaller amount of the fuel than the main injection is injected at a given timing later than the main injection in an expansion stroke. An injection interval period that is a period of time from an end of the main injection to a start of the after-injection is shorter as the injection pressure of the fuel acquired by the injection pressure acquirer increases.

A spray of the fuel injected by the main injection circulates so as to form a vertical vortex along the wall surfaces of the lip part, the peripheral part, and the bottom part of the first cavity part, and then returns to a specific position on an injection axis of the injector. In other words, the oxygen concentration at the specific position greatly varies depending on the turning flow of the fuel spray by the main injection. Thus, in order to increase an air utilization factor of the fuel injected by the after-injection, it is necessary to make a timing at which the fuel spray by the after-injection reaches at the specific position substantially match with a timing at which the oxygen concentration at the specific position becomes dense (may be referred to as the "oxygen arrival timing"). On the other hand, as the result of the research by the present inventors, it is found that the oxygen arrival timing becomes earlier as the injection pressure of the fuel increases. As the control taking in consideration of this regard, according to this configuration, since the injection interval period which is the period of time from the end of the main injection to the start of the after-injection is adjusted so that it becomes shorter as the injection pressure of the fuel increases, the fuel spray by the after-injection can reach the specific position at the suitable timing which suits the tendency of the oxygen arrival timing as described above (i.e., the timing at which the oxygen concentration at the specific position becomes dense), and therefore, the air utilization factor of the fuel spray can be increased. Therefore, the generation of soot accompanying combustion can be effectively reduced, as compared with the case where the injection interval period is fixed.

Moreover, when the injection interval period is adjustable according to the injection pressure as described above, the injection timing of the after-injection can be made earlier depending on the condition and the engine fuel efficiency can be improved, as compared with the case where the injection interval period is fixed. For example, when the injection interval period is set constant regardless of the injection pressure, it is necessary to start the after-injection after the temperature of the combustion chamber is fully dropped, that is, after a comparatively long period of time passes from the end of the main injection (an expansion stroke progresses to some extent) so that the generating amount of soot does not become excessive even if the injection pressure is high or low. This decreases the rate of energy used as the work among the combustion energy based on the after-injection, and therefore, it causes the deterioration in fuel efficiency. On the other hand, like this configuration, when the injection interval period is adjustable according to the injection pressure, the uniform delay of the start timing of the after-injection as described above becomes unnecessary, and the injection timing of the after-injection can be made earlier depending on the condition. This increases the rate of energy converted into the work among the combustion energy based on the after-injection as much as possible, thereby improving the engine fuel efficiency.

The diesel engine system may further include a fuel pressure regulator configured to adjust the injection pressure of the fuel. Among two specific operating points in the given operating range with different loads, when an operating point with a lower load is a first operating point and an operating point with a higher load is a second operating point, the injection controller may control the injector and the fuel pressure regulator so that the injection amount of the main injection at the second operating point becomes the same as the injection amount of the main injection at the first operating point, and the injection pressure of the fuel at the second operating point becomes higher than the injection pressure of the fuel at the first operating point. In this case, the injection interval period may be shorter during operation at the second operating point than during operation at the first operating point.

According to this configuration, at the first operating point and the second operating point which are different in the engine load (as a result, different in the total injection amount of fuel), the necessary amount of fuel can be efficiently injected at the injection pressure which is suitably adjusted by the fuel pressure regulator, and therefore, both the combustion controllability and fuel efficiency can be improved. Moreover, by adjusting the injection interval period according to the injection pressure between the first operating point and the second operating point, the after-injection can be started at the suitable timing at which the high air utilization factor can be acquired, and therefore, the amount of soot can be reduced at both the operating points.

The diesel engine system may further include a fuel pressure regulator configured to adjust an injection pressure of the fuel. The injection pressure acquirer may be an injection pressure sensor configured to detect the injection pressure of the fuel. When the load increases in the given operating range, the injection controller may increase the injection amount of the main injection from a first injection amount to a second injection amount by delaying the end timing of the main injection by the injector, while fixing the start timing of the main injection, and cause the fuel pressure regulator to start a control in which the injection pressure of the fuel is increased from a first injection pressure to a second injection pressure. When a period after the injection amount of the main injection increases to the second injection amount until the injection pressure of the fuel increases to the second injection pressure is a fuel pressure insufficient period, the injection controller may bring the end timing of the main injection earlier and shortens the injection interval period as the injection pressure of the fuel detected by the injection pressure sensor increases, during the fuel pressure insufficient period.

According to this configuration, even if the injection pressure immediately after the load is increased (i.e., immediately after acceleration is started) is insufficient, the amount of fuel which suits the load after the increase can be promptly supplied by the extension of the injection period to increase the output torque, thereby securing the appropriate output response to the acceleration demand. Moreover, during the fuel pressure insufficient period where the injection pressure is insufficient with respect to the target pressure (second injection pressure) immediately after the injection amount is increased by the extension of the injection period, since the end timing of the main injection is made earlier and the injection interval period is shortened as the injection pressure increases, the start timing of the after-injection can be appropriately controlled so that the air utilization factor of the fuel increases, while maintaining the injection amount of the main injection at the injection amount after the increase (second injection amount).

A diesel engine of the diesel engine system may be a multi-cylinder engine having a plurality of cylinders provided with a plurality of injectors. In this case, the injection pressure sensor may be one of a plurality of injection pressure sensors provided to the plurality of injectors, respectively. The injection controller may determine the injection interval period of a specific cylinder, before the injector provided to the specific cylinder injects the fuel and after combustion in the last cylinder in a combustion order is finished, based on the injection pressure detected by the injection pressure sensor provided to the specific injector.

According to this configuration, the appropriate injection interval period for increasing the air utilization factor can be calculated with sufficient accuracy based on the injection pressure which is actually detected at the injector for an arbitrary cylinder immediately before the fuel injection is started in the cylinder.

The injection pressure sensor may be provided to a common pressure accumulation rail configured to pressurize and store the fuel to be supplied to the plurality of cylinders. In this case, the injection controller may determine the injection interval period of a specific cylinder, before the injector provided to the specific cylinder injects the fuel and after combustion in the last cylinder in a combustion order is finished, based on the injection pressure detected by the injection pressure sensor.

According to this configuration, the injection interval period of each cylinder can be calculated with sufficient accuracy based on the injection pressure which is detected immediately before the fuel injection is started in each cylinder while reducing the number of the injection pressure sensors and reducing the cost.

The injector may have a nozzle hole used as an outlet of the fuel, and perform the main injection at a timing where an injection axis extending a center axis of the nozzle hole intersects with the lip part. The injection controller may calculate an oxygen arrival timing that is a timing at which a clean airflow with a high oxygen content returns to a specific position on the injection axis after the end of the main injection, based on a plurality of parameters including the injection pressure of the fuel, and determine the injection interval period based on the calculated oxygen arrival timing.

According to the findings by the present inventors, the oxygen arrival timing, i.e., the timing at which the clean airflow returns to the specific position varies depending on a specific parameter group including the injection pressure of the fuel. According to this configuration, the oxygen arrival timing can be calculated appropriately calculated by a given calculation using the above findings, and by adjusting the start timing of the after-injection so that the fuel spray by the after-injection reaches the specific position at the calculated oxygen arrival timing, the air utilization factor of the fuel spray can be increased to reduce the generating amount of soot.

BRIEF DESCRIPTION OF DRAWINGS

FIG. 8A illustrates a state of the fuel spray at an end of a main injection, and FIGS. 8B and 8C illustrate states of the fuel spray which change with time after the end of the main injection.

FIG. 11A illustrates a relationship between a main injection amount, an injection pressure and an intake pressure, and a turning velocity, FIG. 11B illustrates a relationship between the main injection amount, the injection pressure, the intake pressure and an engine speed, and a turning distance, and FIG. 11C illustrates a relationship between the main injection amount, the injection pressure, the intake pressure, the engine speed, an engine water temperature and a fuel temperature, and a fuel-spray length.

DETAILED DESCRIPTION OF THE DISCLOSURE

<Entire Configuration of Engine>

Figure 1:
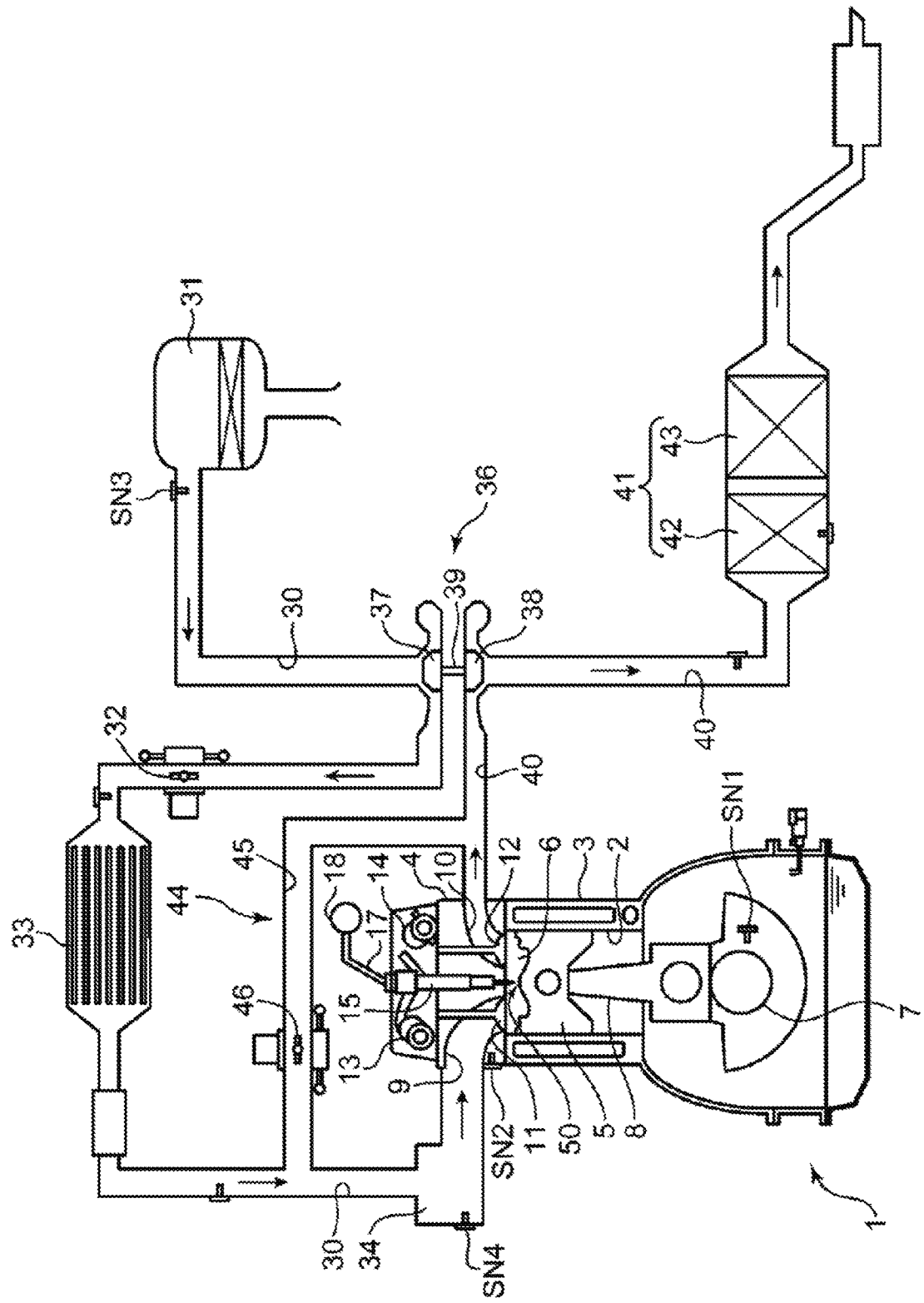
FIG. 1 is a system diagram schematically illustrating one embodiment of a diesel engine system of the present disclosure.

FIG. 1 is a system diagram schematically illustrating one embodiment of a diesel engine system of the present disclosure. A diesel engine illustrated in this figure is a four-cycle diesel engine mounted on a vehicle as a power source for propelling the vehicle. The diesel engine includes an engine body 1 which is driven by supply of fuel which mainly contains diesel fuel, an intake passage 30 where intake air introduced into the engine body 1 circulates, an exhaust passage 40 where exhaust gas flow discharged from the engine body 1 circulates, an exhaust gas recirculation (EGR) system 44 which recirculates a portion of the exhaust gas which circulates the exhaust passage 40 to the intake passage 30, and a turbocharger 36 driven by the exhaust gas which passes through the exhaust passage 40.

The engine body 1 is an in-line multi-cylinder type having a plurality of cylinders 2 (only one is illustrated in FIG. 1) which are lined up in a direction vertical to the drawing sheet of FIG. 1. The engine body 1 includes a cylinder block 3 including a plurality of cylindrical cylinder liners which define the plurality of cylinders 2, respectively, a cylinder head 4 attached to an upper surface of the cylinder block 3 so as to cover upper openings of the cylinders 2, and a plurality of pistons 5 accommodated in the respective cylinders 2 so as to be reciprocatable. Note that since the configurations of all the cylinders 2 are the same, the following description is fundamentally made, while only paying attention to one of the cylinders 2.

A combustion chamber 6 is formed above the piston 5. The combustion chamber 6 is a space formed by a lower surface of the cylinder head 4 (a combustion chamber ceiling surface 6U; see FIG. 3), an inner circumferential surface (cylinder liner) of the cylinder 2, and a crown surface 50 of the piston 5. Fuel is supplied to the combustion chamber 6 by an injection from an injector 15 (described later). A mixture gas of supplied fuel and air combusts in the combustion chamber 6, and an expansive force produced by the combustion depresses the piston 5 and makes it reciprocate in the up-and-down direction.

Below the piston 5, a crankshaft 7 which is an output shaft of the engine body 1 is provided. The crankshaft 7 is connected with the piston 5 through a connecting rod 8, and is rotated about the center axis thereof by the reciprocating motion (up-and-down motion) of the piston 5.

A crank angle sensor SN1 and a water temperature sensor SN2 are attached to the cylinder block 3. The crank angle sensor SN1 detects an angle of rotation (crank angle) of the crankshaft 7, and a rotational speed of the crankshaft 7 (engine speed). The water temperature sensor SN2 detects a temperature of coolant (engine water temperature) which circulates inside the cylinder block 3 and the cylinder head 4.

An intake port 9 and the exhaust port 10 which communicate with the combustion chamber 6 are formed in the cylinder head 4. An intake-side opening which is a downstream end of the intake port 9 and an exhaust-side opening which is an upstream end of the exhaust port 10 are formed in the lower surface of the cylinder head 4. An intake valve 11 which opens and closes the intake-side opening and an exhaust valve 12 which opens and closes the exhaust-side opening are attached to the cylinder head 4.

An intake-side valve operating mechanism 13 and an exhaust-side valve operating mechanism 14 including cam shafts are disposed in the cylinder head 4. The intake valve 11 and the exhaust valve 12 are opened and closed by these valve operating mechanisms 13 and 14 in an interlocked fashion with the rotation of the crankshaft 7.

One injector 15 which injects fuel into the combustion chamber 6 is attached to the cylinder head 4 for every cylinder 2. The injector 15 has a tip-end part 151 (FIG. 3) which is exposed from a ceiling part of the combustion chamber 6, and it is attached to the cylinder head 4 so that the tip-end part 151 is located coaxially with (or near) a cylinder axis X which is the center axis of the cylinder 2. The injector 15 is capable of injecting fuel toward a cavity 5C (described later; see FIGS. 2 and 3) formed in the crown surface 50 of the piston 5.

Figure 3:
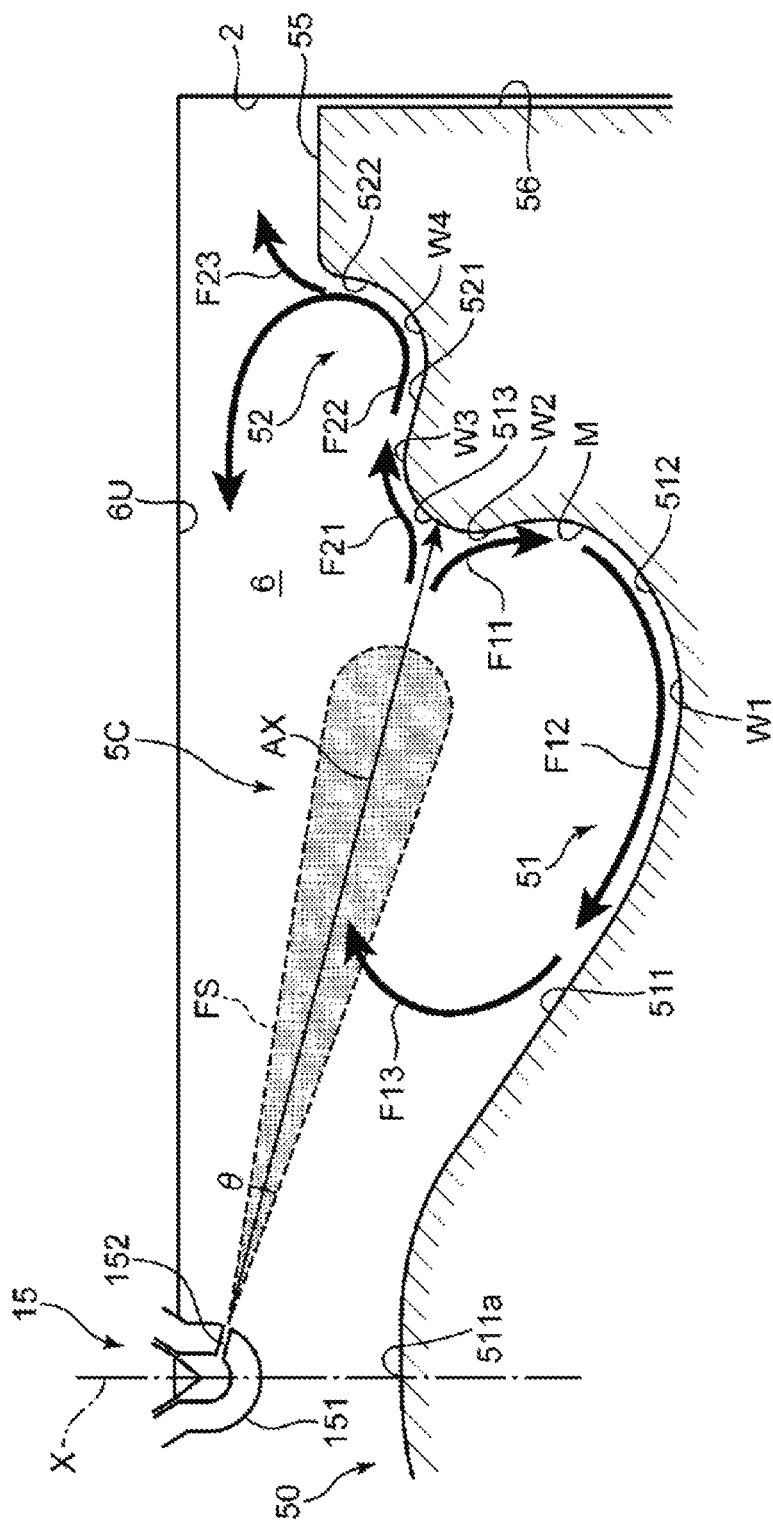
FIG. 3 is a cross-sectional view illustrating a detailed structure of a cavity formed in the crown surface of the diesel piston, and a flow of a spray of fuel injected into the cavity.

A nozzle hole 152 (FIG. 3) used as an outlet of fuel is formed in the tip-end part 151 of the injector 15. Note that although only one nozzle hole 152 is illustrated in FIG. 3, a plurality of nozzle holes 152 are actually formed at an equal pitch in the circumferential direction of the tip-end part 151. The center axis of each nozzle hole 152 inclines so that it is located downwardly as it goes radially outward, i.e., the center axis is oriented downwardly and outwardly. Fuel injected through such a nozzle hole 152 is injected obliquely downward and radially outward from the tip-end part 151 of the injector 15.

The injector 15 of each cylinder 2 is connected with a common rail 18 (pressure accumulation rail) common to all the cylinders 2 through a fuel feed pipe 17. High-pressure fuel which is pressurized by a fuel pump (outside the drawing) is stored in the common rail 18. By supplying to the injector 15 of each cylinder 2 the fuel which is pressurized inside the common rail 18, the fuel is injected from each injector 15 into the combustion chamber 6 at a high pressure (e.g., about 150 MPa to 250 MPa).

Inside the injector 15, an injection pressure sensor SN5 (FIG. 4: injection pressure acquirer) which detects an injection pressure which is a pressure of the fuel therein, in other words, a pressure of the fuel to be injected from the injector 15 is provided. One injection pressure sensor SN5 is provided to each of the plurality of injectors 15 corresponding to the plurality of cylinders 2.

Although not illustrated in FIG. 1, a fuel pressure regulator 16 and a fuel temperature sensor SN6 (see FIG. 4 for both) are provided to piping which connects the fuel pump with the common rail 18. The fuel pressure regulator 16 adjusts the pressure of the common rail 18, i.e., the pressure of the fuel supplied to the injector 15 (fuel pressure). The fuel temperature sensor SN6 is a sensor which detects a temperature of the fuel supplied to the injector 15 (fuel temperature).

The turbocharger 36 includes a compressor 37 disposed in the intake passage 30, a turbine 38 disposed in the exhaust passage 40, and a turbine shaft 39 which couples the compressor 37 to the turbine 38. The turbine 38 is rotated by receiving energy of exhaust gas which flows through the exhaust passage 40. The compressor 37 is rotated interlockingly with the rotation of the turbine 38 to compress (supercharge) air which circulates the intake passage 30.

The intake passage 30 is connected to one side surface of the cylinder head 4 so as to communicate with the intake port 9. Air (fresh air) taken in from an upstream end of the intake passage 30 is introduced into the combustion chamber 6 through the intake passage 30 and the intake port 9. In the intake passage 30, an air cleaner 31, the compressor 37, a throttle valve 32, an intercooler 33, and a surge tank 34 are disposed sequentially from upstream.

The air cleaner 31 removes foreign matters in intake air to purify the intake air. The throttle valve 32 is an electromotive butterfly valve capable of adjusting a flow rate of intake air in the intake passage 30. The compressor 37 is an impeller which pressurizes intake air and pumps it to downstream of the intake passage 30. The intercooler 33 is a heat exchanger which cools the intake air pressurized by the turbocharger 36 (compressor 37). The surge tank 34 is a tank which provides a space for equally dividing intake air to a plurality of cylinders 2, and is disposed immediately upstream of an intake manifold which continues to the intake port 9 of each cylinder 2.

In the intake passage 30, an air flow sensor SN3 and an intake pressure sensor SN4 are disposed. The air flow sensor SN3 is disposed downstream of the air cleaner 31, and it detects a flow rate of intake air which passes through this part. The intake pressure sensor SN4 is disposed at the surge tank 34, and it detects a pressure of intake air which passes through the surge tank 34. Note that since the surge tank 34 is disposed downstream of the compressor 37 of the turbocharger 36, the intake pressure detected by the intake pressure sensor SN4 is an intake pressure after being boosted by the turbocharger 36 (compressor 37), i.e., a boost pressure.

The exhaust passage 40 is connected to the other side surface of the cylinder head 4 so as to communicate with the exhaust port 10. Combusted gas (exhaust gas) generated in the combustion chamber 6 is discharged outside of the vehicle through the exhaust port 10 and the exhaust passage 40. In exhaust passage, the turbine 38 and an exhaust emission control device 41 are disposed from upstream in this order.

The turbine 38 is an impeller which is rotated by energy of the exhaust gas, and gives a rotational force to the compressor 37 inside the intake passage 30 through the turbine shaft 39. The exhaust emission control device 41 purifies hazardous components in the exhaust gas.

The exhaust emission control device 41 includes therein an oxidation catalyst 42 which oxidizes and detoxicates CO and HC in the exhaust gas, and a DPF (Diesel Particulate Filter) 43 for capturing particulate matters contained in the exhaust gas.

The EGR system 44 includes an EGR passage 45 which connects the exhaust passage 40 to the intake passage 30, and an EGR valve 46 which is provided in the EGR passage 45 so as to be openable and closable. The EGR passage 45 connects a part of the exhaust passage 40 upstream of the turbine 38 to a part of the intake passage 30 between the intercooler 33 and the surge tank 34. The EGR valve 46 adjusts a flow rate of the exhaust gas (EGR gas) which recirculates from the exhaust passage 40 to the intake passage 30 through the EGR passage 45.

<Detailed Structure of Piston>

Figure 2A:
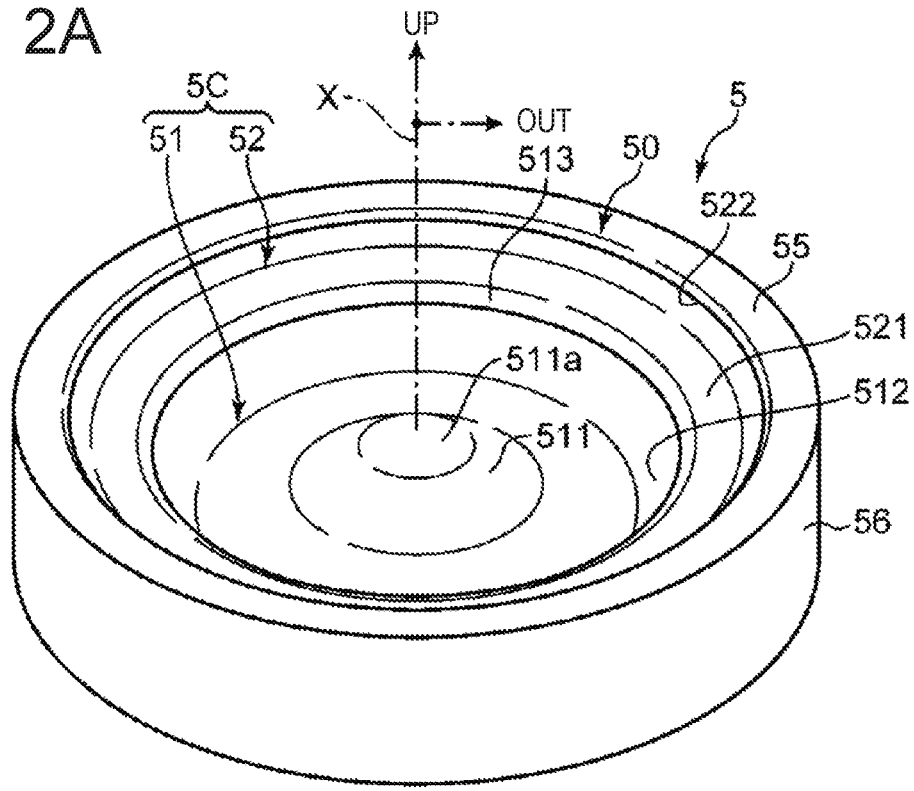
FIG. 2A is a perspective view illustrating a structure of a crown surface of a piston in the diesel engine system.
Figure 2B:
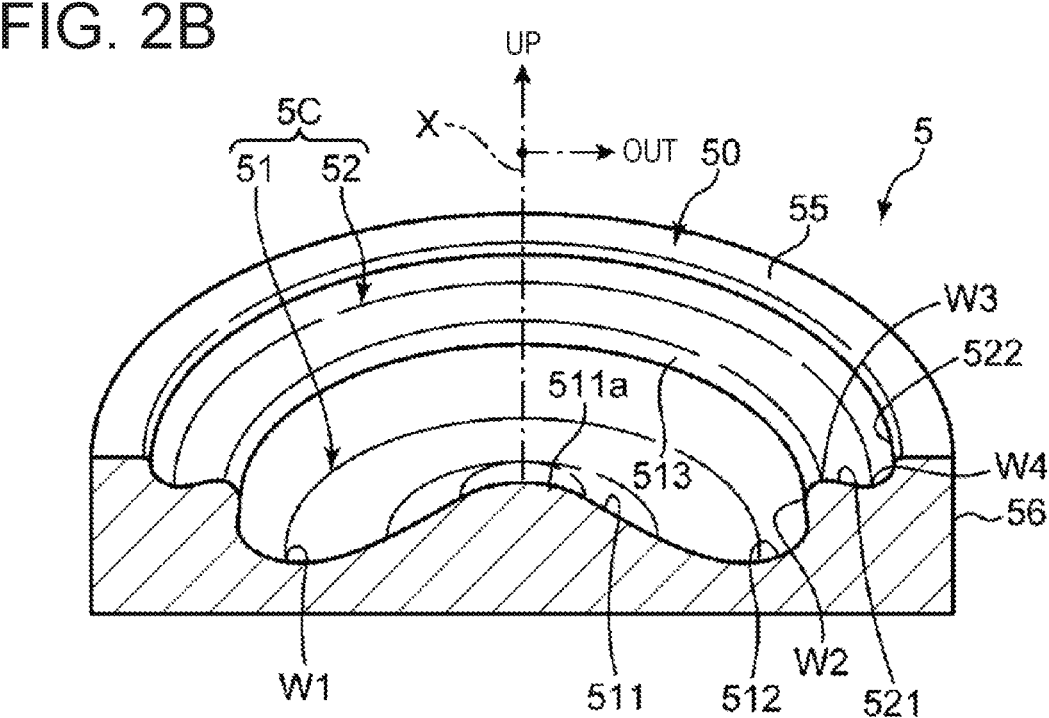
FIG. 2B is a cross-sectional perspective view thereof.

Next, a configuration of the piston 5, particularly a configuration of the crown surface 50 is described in detail. FIG. 2A is a perspective view mainly illustrating an upper part of the piston 5 (a vicinity part of the crown surface 50). FIG. 2B is a cross-sectional perspective view of the piston 5 illustrated in FIG. 2A, taken along a vertical plane including the cylinder axis X. FIG. 3 is an enlarged cross-sectional view of a part of the crown surface 50 of the piston 5, illustrated with other combustion chamber forming surfaces (an inner circumferential surface of the cylinder 2 and the combustion chamber ceiling surface 6U).

The piston 5 has the crown surface 50 described above which defines the bottom surface of the combustion chamber 6, and a cylindrical side circumferential surface 56 which continues to an outer circumferential edge of the crown surface 50.

The cavity 5C is formed in the crown surface 50, which is formed by denting downwardly (opposite from the cylinder head 4) the major area of the crown surface 50 including the center part. In other words, the crown surface 50 has a wall surface which defines the cavity 5C (a bottom part 511, a peripheral part 512, a lip part 513, a shelf part 521, a rising part 522, which will be described later), and a squish surface 55 comprised of an annular flat surface formed radially outward of the cavity 5C.

The cavity 5C is a so-called "reentrant" cavity. Particularly, the cavity 5C of this embodiment is a reentrant cavity of vertical 2-step type including a first cavity part 51 and a second cavity part 52. The first cavity part 51 is a recess formed in an area of the crown surface 50 including the radially center part, and the second cavity part 52 is an annular recess formed above the first cavity part 51 of the crown surface 50.

The crown surface 50 has, as the wall surfaces which define the first cavity part 51, the bottom part 511, the peripheral part 512, and the lip part 513.

The bottom part 511 is the wall part which defines the bottom surface of the first cavity part 51. The bottom part 511 is formed in a gentle mountain shape, and it has a top part 511a in the radially center part (a location opposing to the tip-end part 151 of the injector 15) which is immediately below the injector 15. That is, the bottom part 511 is formed so that its height is gradually lowered from the top part 511a to the outside in the radial direction. The height of the bottom part 511 is set so that it becomes the lowest at a first boundary part W1 which is a boundary between the bottom part 511 and the peripheral part 512.

The peripheral part 512 is a wall part successively formed from the bottom part 511 at a location radially outward of the bottom part 511, and has a dented shape so that it is convexed radially outward in the cross-sectional view. The peripheral part 512 is curved in a recessed shape so that it smoothly connects between the first boundary part W1 which is the boundary between the bottom part 511 and the peripheral part 512, and a second boundary part W2 which is the boundary between the peripheral part 512 and the lip part 513. That is, the peripheral part 512 has a first part which is curved so that its height becomes gradually higher from the first boundary part W1 to the outside in the radial direction, and a second part which is curved so that its diameter is gradually reduced from an upper end of the first part toward the second boundary part W2. In other words, the peripheral part 512 is formed so as to be dented the most to the outside in the radial direction at an intermediate part M (FIG. 3) which is a boundary between these first and second parts.

The lip part 513 is the wall part successively formed above the peripheral part 512, and has a protruding shape so as to be convex to the inside in the radial direction in the cross-sectional view. The lip part 513 is curved so as to be convex (a bump shape) so that it smoothly connects between the second boundary part W2 which is the boundary between the peripheral part 512 and the lip part 513, and a third boundary part W3 which is a boundary between the lip part 513 and the shelf part 521 described later (i.e., a boundary between the first cavity part 51 and the second cavity part 52).

The crown surface 50 has the shelf part 521 and the rising part 522 which are the wall surfaces defining the second cavity part 52, in addition to the wall surfaces defining the first cavity part 51 (the bottom part 511, the peripheral part 512, and the lip part 513).

The shelf part 521 is the wall part which defines the bottom surface of the second cavity part 52, and is successively formed from the lip part 513 of the first cavity part 51 at a location outside in the radial direction of the lip part 513. The shelf part 521 inclines so that its height becomes gradually lower from the third boundary part W3 which is the boundary between the lip part 513 and the shelf part 521 to a fourth boundary part W4 which is a boundary between the shelf part 521 and the rising part 522.

The rising part 522 is a wall part successively formed from the shelf part 521 at a location outside in the radial direction, and has a shape which rises from the shelf part 521. The rising part 522 is curved so as to smoothly connect between the fourth boundary part W4 which is the boundary between the shelf part 521 and the rising part 522, and an inner circumferential edge of the squish surface 55, and it is formed so that its height becomes gradually higher to the outside in the radial direction.

<Flow of Fuel Spray>

Next, a flow of the fuel spray injected from the injector 15 into the cavity 5C of the piston 5 is described with reference to FIG. 3. In FIG. 3, a spray of fuel immediately after being injected from the injector 15 in a state where the piston 5 is located at or near a compression top dead center is represented by a reference character "FS," and a main axis of the fuel spray FS, in other words, an injection axis which is an axis extending the center axis of the nozzle hole 152 of the injector 15 is represented by a reference character "AX." Moreover, a flow of the major fuel spray after the fuel spray FS collides with the wall surface of the cavity 5C (lip part 513) is represented by reference characters F11, F12, F13, F21, F22, and F23. Note that when the fuel is injected near a compression top dead center in the diesel engine like this embodiment, the fuel begins burning after a slight period of time from the injection (diffuse combustion). Therefore, the fuel spray FS becomes what fundamentally contains combustion gas in addition to atomized fuel. Note that, herein, the fuel spray shall only be referred to as "the fuel spray" or "the spray," without particularly distinguishing a fuel spray containing the combustion gas from a fuel spray not containing the combustion gas.

The fuel injected from the nozzle hole 152 of the injector 15 is atomized while being diffused with a spray angle θ, and flies along the injection axis AX. When the piston 5 is at or near a compression top dead center, the fuel injected from the nozzle hole 152 (fuel spray FS) is directed to the lip part 513 of the cavity 5C. In other words, the injector 15 has the nozzle hole 152 which is capable of directing the fuel injected at or near a compression top dead center to the lip part 513.

The fuel spray FS injected toward the lip part 513 collides with the lip part 513, where it is divided into a fuel spray (arrow F11) which goes toward the first cavity part 51 (downward), and a fuel spray (arrow F21) which goes toward the second cavity part 52 (upward). The divided fuel spray flows along the shapes of the wall surfaces of the cavity parts 51 and 52, while being mixed with air which exists in the first and second cavity parts 51 and 52, respectively.

In detail, the fuel spray illustrated by the arrow F11 is changed in the course to downward at the lip part 513, and then enters into the peripheral part 512 of the first cavity part 51. The fuel spray which entered into the peripheral part 512 is then changed in the flow direction from downward to radially inward along the curved shape of the peripheral part 512, and as illustrated by the arrow F12, it then flows along the shape of the wall surface of the bottom part 511. Since the bottom part 511 is formed so that it rises as it goes inward in the radial direction, the fuel spray illustrated by the arrow F12 is raised upwardly, and as illustrated by the arrow F13, it is finally changed in the course so as to go radially outward and upward, and flows so as to return to the location on the injection axis AX which is the main axis of the initial fuel spray (the fuel spray FS immediately after discharged from the nozzle hole 152). Thus, the fuel spray which entered into the first cavity part 51 performs a turning flow so as to form a vertical vortex inside the first cavity part 51.

On the other hand, the fuel spray illustrated by the arrow F21 is changed in the course to upwardly at the lip part 513, and then enters into the shelf part 521 of the second cavity part 52. The fuel spray which entered into the shelf part 521 flows obliquely downward along the slope of the shelf part 521, and as illustrated by the arrow F22, it is raised upward along the curved wall surface of the rising part 522, and then eventually flows radially inward along the combustion chamber ceiling surface 6U.

Here, an upper end of the rising part 522 is not provided with a shape which protrudes radially inward like the lip part 513. Therefore, the flow of the fuel spray illustrated by the arrow F22 will not be excessively strengthened, and the fuel spray (arrow F23) which flows radially outward after branched from the arrow F22 is also generated. Particularly, since in the second half of combustion the flow of the arrow F22 is towed by a reverse squish flow (a flow which goes radially outward along the squish surface 55), the flow of the arrow F23 becomes easier to be produced. Since this facilitates utilization of air which exists above the squish surface 55, it leads to suppressing a generation of soot.

As described above, by branching the fuel spray which entered into the second cavity part 52 to the two directions illustrated by the arrows F22 and F23, this fuel spray is distributed in a comparatively large area in an upper part of the combustion chamber 6. Therefore, the flow of each fuel spray after branched is not so strong, and especially the flow of the arrow F22 after being changed in the course inward in the radial direction becomes comparatively weak. Therefore, the fuel spray illustrated by the arrow F22 does not substantially generate the turning flow which returns to the location on the injection axis AX. In this regard, it is different from the fuel spray inside the first cavity part 51 which generates the turning flow as illustrated by the arrows F11, F12, and F13.

<Control System>

Figure 4:
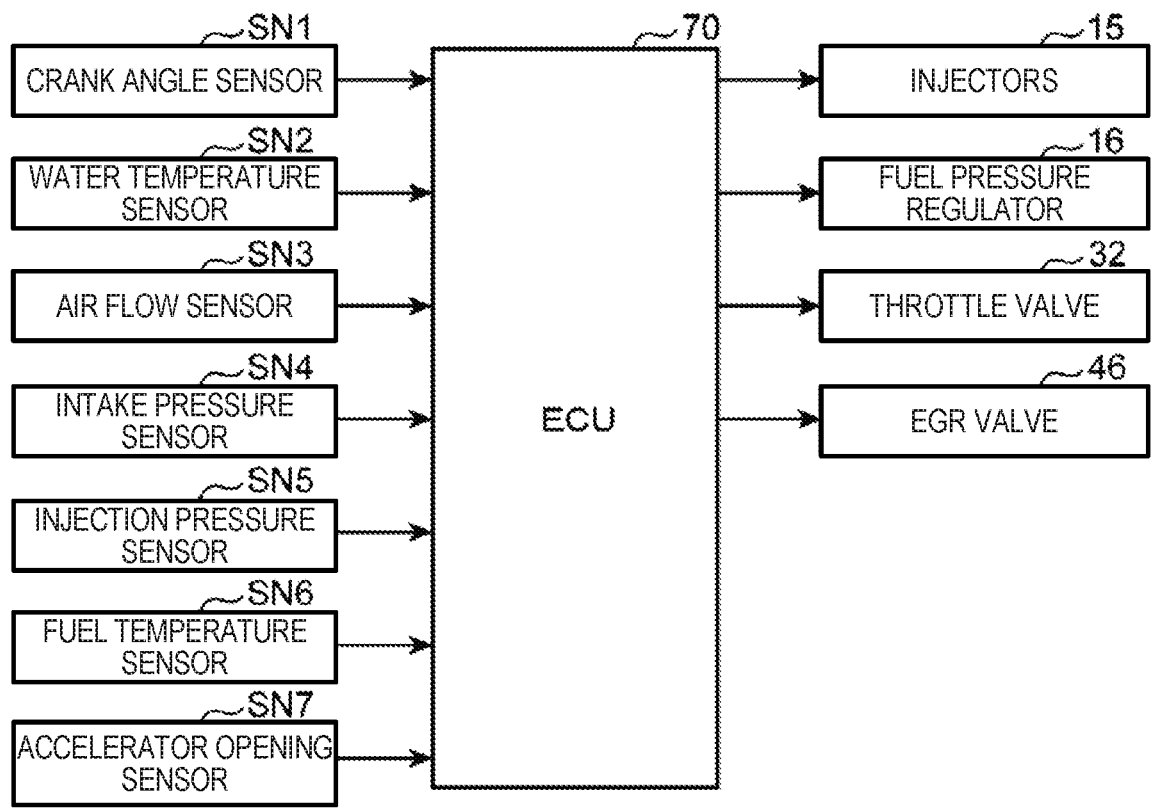
FIG. 4 is a block diagram illustrating a control system of the diesel engine system.

FIG. 4 is a block diagram illustrating a control system of the diesel engine. An engine control unit (ECU) 70 illustrated in this figure is a microcomputer for comprehensively controlling the engine, and is comprised of a processor (e.g., a central processing unit (CPU)), memory (e.g., read-only memory (ROM) and/or random access memory (RAM)), etc., which are well-known.

Detection information by the various sensors are inputted into the ECU 70. For example, the ECU 70 is electrically connected to the crank angle sensor SN1, the water temperature sensor SN2, the air flow sensor SN3, the intake pressure sensor SN4, the injection pressure sensor SN5, and the fuel temperature sensor SN6, which are described above. Information detected by these sensors SN1-SN6, i.e., information, such as a crank angle, an engine speed, an engine water temperature, an intake air amount, an intake pressure, a fuel injection pressure, and a fuel temperature are sequentially inputted into the ECU 70.

Moreover, an accelerator opening sensor SN7 which detects an accelerator opening which is an opening of an accelerator pedal operated by a driver who operates the vehicle is provided to the vehicle. Detection information by this accelerator opening sensor SN7 is also sequentially inputted into the ECU 70.

The ECU 70 controls each engine part, while performing the various determinations and calculations based on the information inputted from the sensors SN1-SN7. That is, the ECU 70 is electrically connected to the injector 15, the fuel pressure regulator 16, the throttle valve 32, the EGR valve 46, etc., and outputs a control signal to these components based on the results of the determinations and calculations. The ECU 70 is an example of an injection controller in the present disclosure.

<Fuel Injection Control in Diffuse-combustion Range>

Figure 5:
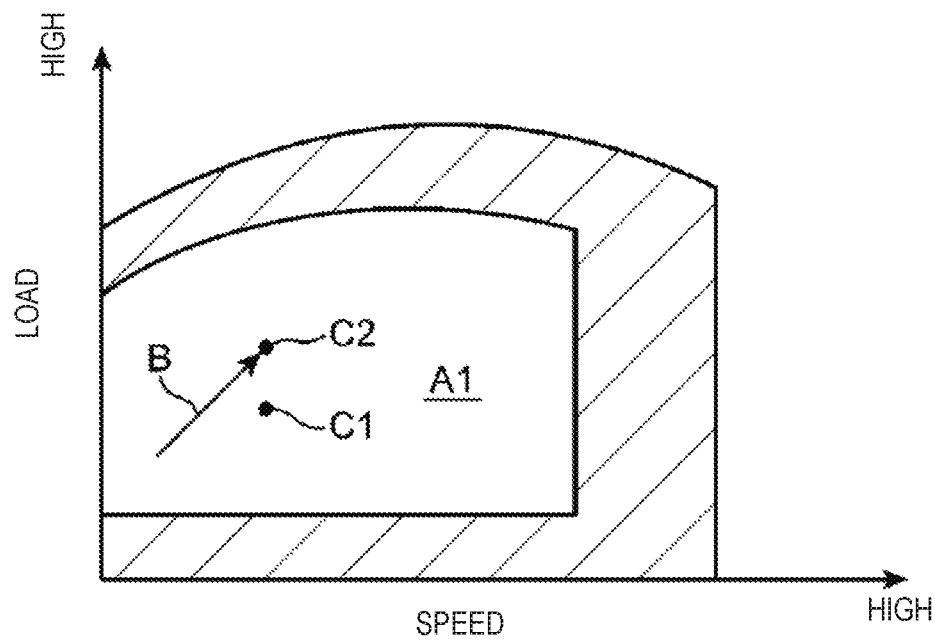
FIG. 5 is an operation map illustrating a diffuse-combustion range of the diesel engine system.

Next, an injection control in a diffuse-combustion range A1 illustrated in FIG. 5 is described as a representative control of fuel injection in the engine. The diffuse-combustion range A1 illustrated in FIG. 5 is an operating range in which a major part of fuel injected from the injector 15 is combusted by diffuse combustion, and is set as a major area excluding a super low-load range, a super high-load range, and a super high-speed range of the engine. Note that the diffuse combustion is a well-known combustion form widely adopted in diesel engines, and it is a form in which fuel injected from the injector 15 is mixed with air by a diffusion action while being evaporated, and the mixture gas is combusted from a part where the mixture gas becomes combustible (mainly near a boundary between the fuel spray and air) by self-ignition.

Figure 6:
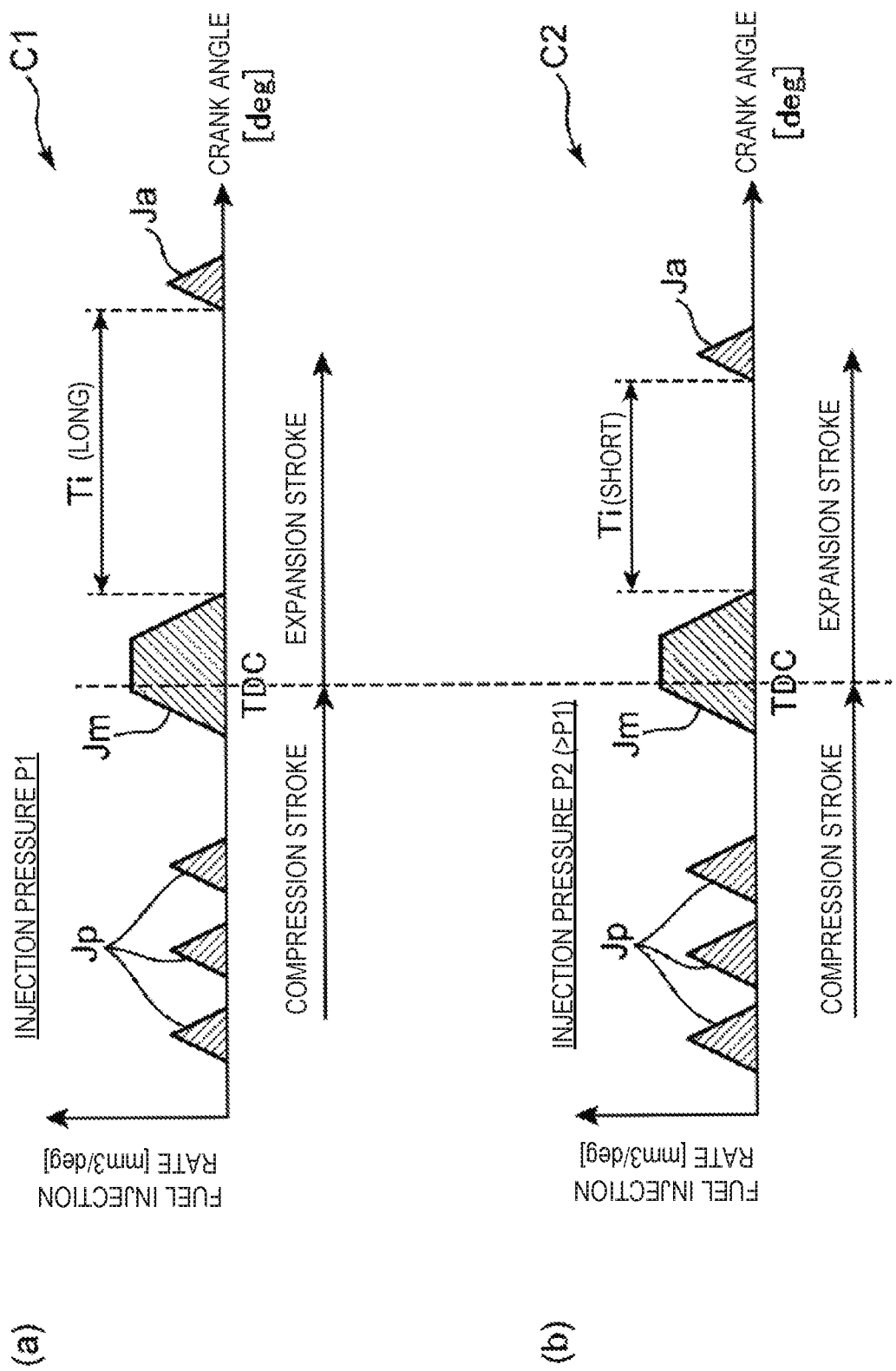
FIG. 6 illustrates a time chart of injection patterns of fuel adopted at two specific operating points in the diffuse-combustion range, where part (a) illustrates the injection pattern at a first operating point, and part (b) illustrates the injection pattern at a second operating point.

When the total amount of fuel to be supplied from the injector 15 to the combustion chamber 6 (cylinder 2) in one combustion cycle is a total injection amount, an injection pattern in which the largest amount (ratio) of fuel among the total injection amount is injected at or near a compression top dead center is adopted in the diffuse-combustion range A1 of FIG. 5. FIG. 6 is a time chart illustrating injection patterns adopted at two representative operating points C1 and C2 in the diffuse-combustion range A1, where the horizontal axis is a crank angle (deg) and the vertical axis is a fuel injection rate ($mm^3$/deg) on the basis of the crank angle. The operating points C1 and C2 have a relationship in which the engine speeds are the same and the loads are different. Below, the operating point C1 with a lower load is referred to as "the first operating point," and the operating point C2 with a higher load is referred to as "the second operating point."

As illustrated in part (a) of FIG. 6, at the first operating point C1, three pre-injections Jp, one main injection Jm, and one after-injection Ja are performed. The main injection Jm is a fuel injection performed at or near a compression top dead center which is a top dead center (TDC) between a compression stroke and an expansion stroke, and, for example, it is performed during a given period over the compression top dead center as illustrated. Such an injection period of the main injection Jm includes at least a timing where the injection axis AX of the injector 15 intersects with the lip part 513 of the first cavity part 51 (see FIG. 3). The pre-injection Jp is a fuel injection performed during a compression stroke before the main injection Jm. The after-injection Ja is a fuel injection performed during an expansion stroke after the main injection Jm. In the main injection Jm among the main, pre-, and after-injections, the largest amount (ratio) of fuel among the total injection amount in one combustion cycle is injected.

Similarly, also at the second operating point C2, as illustrated in part (b) of FIG. 6, three pre-injections Jp, one main injection Jm, and one after-injection Ja are performed. The ratio of the injection amount by the main injection Jm is the largest, similarly to the first operating point C1. However, since the load (engine demanded torque) is higher at the second operating point C2 than the first operating point C1, the total injection amount at the second operating point C2 needs to be increased more than that at the first operating point C1. In the illustrated example, this increased amount of fuel is assigned only to the pre-injection Jp. That is, when the second operating point C2 is compared with the first operating point C1, the injection amount of the pre-injection Jp at the second operating point C2 becomes more than the injection amount of the pre-injection Jp at the first operating point C1. On the other hand, the injection amounts of the main injection Jm and the after-injection Ja are the same at the first operating point C1 and the second operating point C2.

The reason why the increased amount of load (demanded torque) between the first and second operating points C1 and C2 is provided only by the increase in the amount of the pre-injection Jp, is to secure a necessary combustion stability under an environment where an amount of EGR gas is comparatively large. That is, in the engine of this embodiment, the comparatively large amount of EGR gas (exhaust gas which recirculates to the intake passage 30 through the EGR system 44) is introduced into the combustion chamber 6 in a middle-load range which includes the first and second operating points C1 and C2. When the load increases in such a middle-load range, if the injection amounts of the main injection Jm and the after-injection Ja are increased unduly, the ignition stability may be lowered, originating from a lack of the atomization time of fuel. Therefore, when comparing different conditions of load in the middle-load range, like the relationship between the first and second operating points C1 and C2 as described above, only the injection amount of the pre-injection Jp which is earlier in the injection timing (therefore, it is easier to secure the atomization time) may be changed, and the injection amount of the main injection Jm and the after-injection Ja thereinafter may not be changed.

The injection pattern of fuel in the diffuse-combustion range A1 is fundamentally determined with reference to predefined map data. In detail, the memory of the ECU 70 stores beforehand map data in which the injection amount and the injection timing of the pre-injection Jp (or the number of injections), the injection amount and the injection timing of the main injection Jm, and the injection amount of the after-injection Ja are defined for every operating condition (the load, the engine speed, etc.). During operation in the diffuse-combustion range A1, the ECU 70 determines an injection pattern which suits the current operating condition (operating point) by referring to the map data, and causes the injector 15 to inject fuel according to the determined injection pattern.

Note that the injection timing of the after-injection Ja is calculated by a calculation as needed, without using the map data. Although the details will be described later, the injection timing of the after-injection Ja is determined so that an injection interval period (Ti in FIG. 6) which is a period of time from the end of the main injection Jm to the start of the after-injection Ja becomes a desirable period of time defined in terms of the air utilization factor.

Moreover, the memory of the ECU 70 stores map data in which a target injection pressure which is a target value of the injection pressure of fuel from the injector 15 is defined beforehand for every engine operating condition (the load, the engine speed, etc.), and controls the fuel pressure regulator 16 so that the actual injection pressure matches with the target injection pressure. The target injection pressure is set so that it becomes higher as the engine load increases and the total injection amount in one combustion cycle increases. This is to inject a comparatively large amount of fuel corresponding to the high load within a limited period of time by increasing the amount of fuel which can be injected per unit time. Conversely, since the target injection pressure becomes lower on the condition where the engine load is low (the total injection amount is small), the load of the fuel pump can be reduced to improve fuel efficiency.

According to the setting of the target injection pressure as described above, suppose that the target injection pressure at the first operating point C1 is P1 and the target injection pressure at the second operating point C2 is P2, a relationship where the latter is higher than the former is established (P2>P1). In consideration of both of this fact and the relationship of the injection amount described above, in this embodiment, a relationship in the following Table 1 is established in the comparison of the first operating point C1 with the second operating point C2.

TABLE 1

| | Load | Injection Pressure | Total Injection Amount | Pre-injection Amount | Main injection Amount | After-injection Amount |
|---|---|---|---|---|---|---|
| First Operating Point | Low | Low | Small | Small | Same | Same |
| Second Operating Point | High | High | Large | Large | Same | Same |

That is, when the injection pattern at the first operating point C1 is compared with the injection pattern at the second operating point C2 at which the load is higher than in the first operating point C1, the injection pressure of fuel, the total injection amount, and the pre-injection amount are all higher in the second operating point. On the other hand, the main injection amount and the after-injection amount are the same at the first and second operating points C1 and C2.

Note that in the comparison between the different operating points in the diffuse-combustion range A1, the relationship as illustrated in Table 1 (the relationship in which only the injection amount of the pre-injection differs) is established only in the limited range of the diffuse-combustion range A1, and various properties (the injection amounts and the injection timings of the main injection and the after-injection) other than the injection amount of the pre-injection may differ in other ranges.

Figure 7:
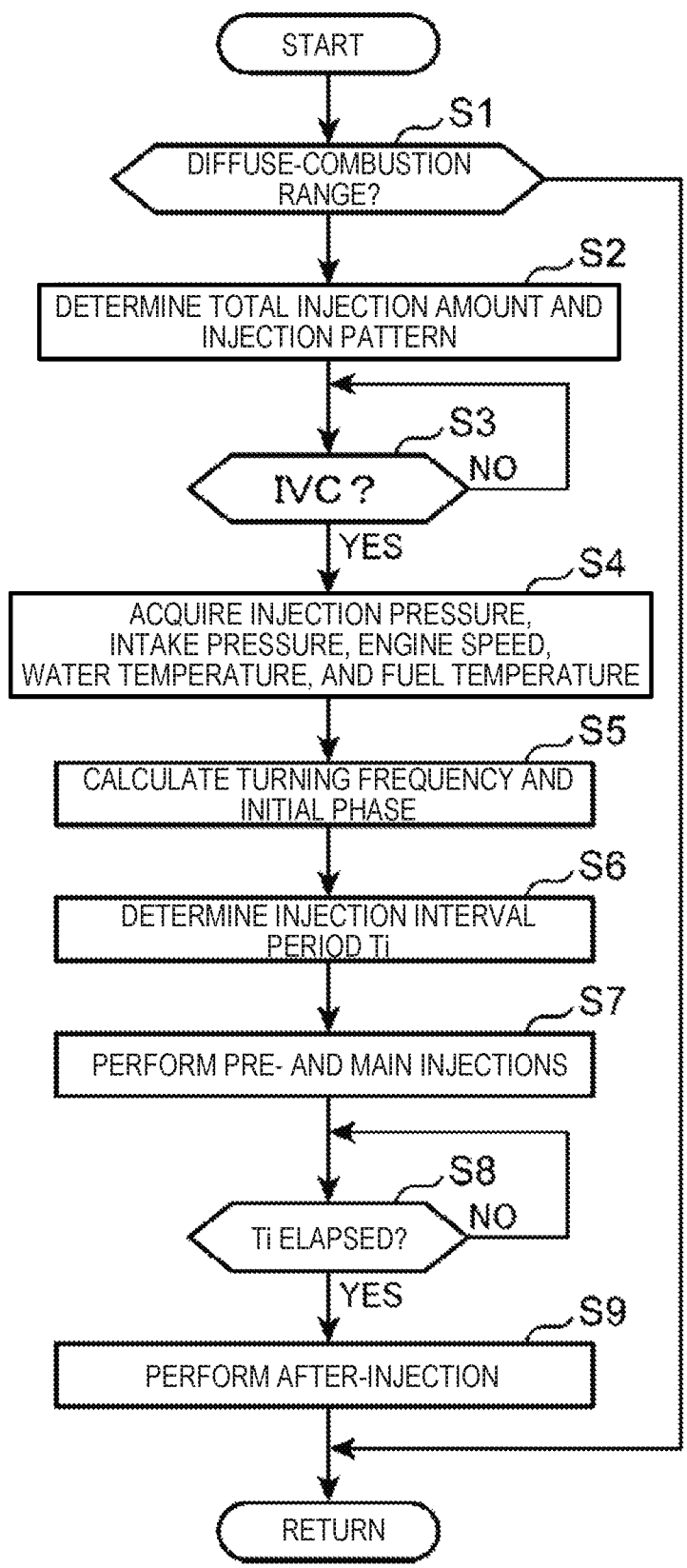
FIG. 7 is a flowchart illustrating a concrete procedure of a fuel injection control executed in the diffuse-combustion range.

Next, a procedure of the fuel injection control in the diffuse-combustion range A1 is described with reference to a flowchart of FIG. 7. When the control illustrated in this flowchart starts, the ECU 70 determines whether the current engine operating point is included in the diffuse-combustion range A1 illustrated in FIG. 5 (Step S1). That is, the ECU 70 determines whether the current engine operating point is included in the diffuse-combustion range A1 based on the engine speed detected by the crank angle sensor SN1, the engine load (demanded torque) specified from the detection value (accelerator opening) of the accelerator opening sensor SN7, etc.

If determined as YES at Step S1, and it is confirmed that the current operating point is included in the diffuse-combustion range A1, the ECU 70 determines the total injection amount which is the total amount of fuel to be injected from the injector 15 in the next combustion cycle, and the injection pattern for injecting fuel corresponding to the total injection amount (Step S2). For example, the total injection amount is determined so that it increases as the engine load becomes higher, and the injection pattern is determined based on the map data described above which is stored beforehand in the memory of the ECU 70. The injection pattern determined here includes the injection amount and the injection timing (or the number of injections) of the pre-injection Jp, the injection amount and the injection timing of the main injection Jm, and the injection amount of the after-injection Ja. On the other hand, the injection timing of the after-injection Ja is not determined here, but it will be determined based on the injection interval period calculated at Step SS6 described later.

Next, the ECU 70 determines whether it reaches a close timing of the intake valve 11 (IVC) (Step S3). That is, the ECU 70 determines whether the intake valve 11 of the cylinder 2 where fuel is going to be injected is closed.

At Step S3, if it is determined as YES, and it is confirmed that it reaches the close timing of the intake valve 11, the ECU 70 acquires the injection pressure of fuel, the intake pressure, the engine speed, the engine water temperature, and the fuel temperature from the sensors (Step S4). In detail, the ECU 70 acquires the injection pressure of fuel from the detection value of the injection pressure sensor SN5 provided to the injector 15 of the target cylinder 2, acquires the intake pressure from the detection value of the intake pressure sensor SN4, acquires the engine speed from the detection value of the crank angle sensor SN1, acquires the engine water temperature from the detection value of the water temperature sensor SN2, and acquires the fuel temperature from the detection value of the fuel temperature sensor SN6.

Next, the ECU 70 calculates a turning frequency and an initial phase of the fuel spray injected by the main injection Jm based on the information acquired at Step S4 (the injection pressure, the intake pressure, the engine speed, the engine water temperature, and the fuel temperature) and the injection amount of the main injection Jm determined at Step S2 (Step S5). Here, the turning frequency is the number of turns per unit time of the fuel spray which carries out the turning flow in the first cavity part 51 of the piston 5 like the arrows F11, F12, and F13 illustrated in FIG. 3. The initial phase is an initial phase of a periodic function when an oxygen concentration which varies with the turning flow of the fuel spray (see FIGS. 8A to 8C) is assumed to be the periodic function (see FIG. 9).

Figure 8A:
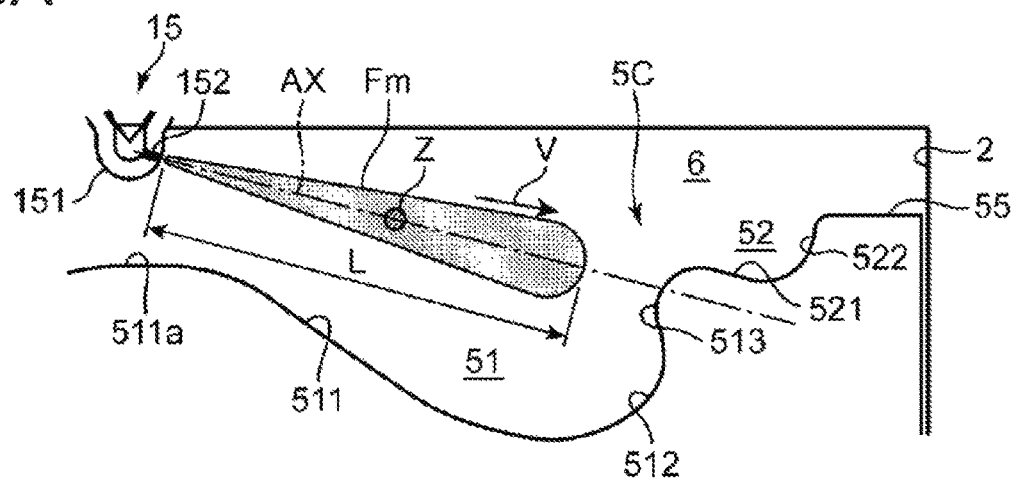
FIGS. 8A to 8C are views schematically illustrating a flow of the fuel spray which flows inside the cavity, where
Figure 8B:
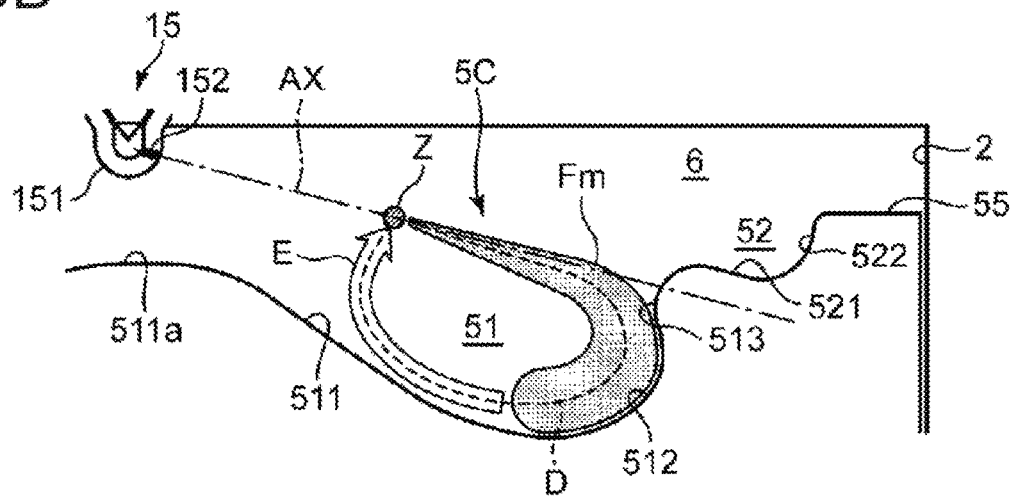
Figure 8C:
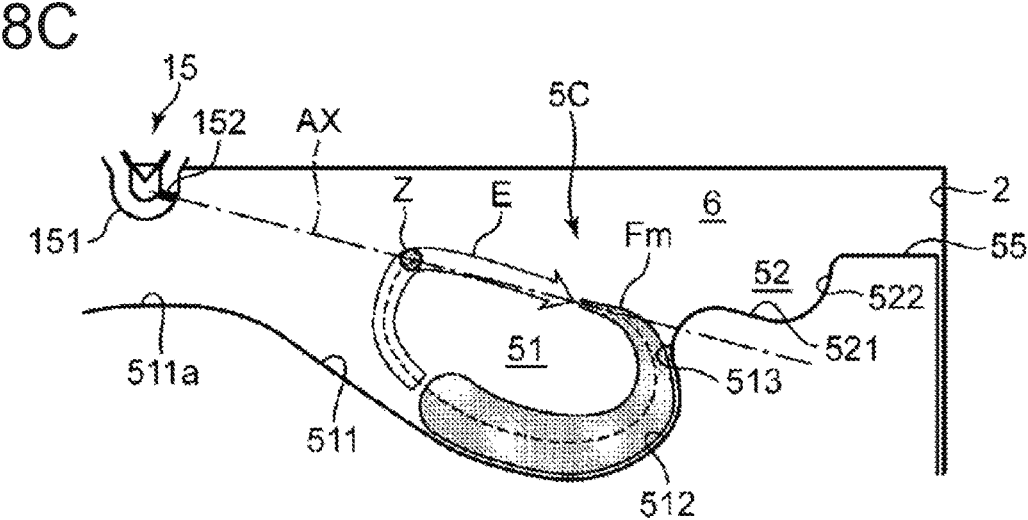

FIGS. 8A to 8C are views schematically illustrating a flow of the fuel spray by the main injection Jm which carries out the turning flow inside the first cavity part 51, where FIG. 8A illustrates a state of the fuel spray at the end of the main injection Jm, and FIGS. 8B and 8C illustrate states of the fuel spray which are changed with time after the main injection Jm is ended. As illustrated in these figures, a fuel spray Fm injected by the main injection Jm (actually, a mixture of combustion gas and atomized fuel) near a compression top dead center (or in a given period over the compression top dead center) turns or circulates so as to form the vertical vortex along the wall surfaces of the lip part 513, the peripheral part 512, and the bottom part 511 which constitute the first cavity part 51, and then returns to a location on the injection axis AX of the injector 15 (an extension of the center axis of the nozzle hole 152). Suppose that an intersection between the main axis of the fuel spray Fm which returned onto the injection axis AX by such a turning flow and the injection axis AX is a turning reference point Z, the oxygen concentration at the turning reference point Z varies according to a degree of progress of the turning flow of the fuel spray Fm.

That is, at the timing of FIG. 8A which is the end timing of the main injection Jm, since the fuel spray Fm is just passing through the turning reference point Z, the oxygen concentration at the turning reference point Z is very thin. This condition where the oxygen concentration is thin continues until the timing of FIG. 8B where the fuel spray Fm completely passes through the turning reference point Z. However, at this timing, as illustrated by a white arrow E, a flow of air with a high oxygen content occurs (hereinafter, referred to as "the clean airflow") so that it is drawn by the negative pressure caused at the rear end of the fuel spray Fm, and this clean airflow E starts flowing into the turning reference point Z. Therefore, after the timing of FIG. 8B, the oxygen concentration at the turning reference point Z gradually increases. Then, at the timing of FIG. 8C where the rear end of the fuel spray Fm is separated from the turning reference point Z, a condition where an intermediate part of the clean airflow E passes through the turning reference point Z is acquired, and at this timing, the oxygen concentration at the turning reference point Z becomes the highest. Note that the oxygen concentration gradually increases from FIG. 8B to FIG. 8C because the oxygen concentration of the clean airflow E becomes higher as it separates from the fuel spray Fm (in other words, as it is closer to the center of the clean airflow E in the flow direction).

Figure 9:
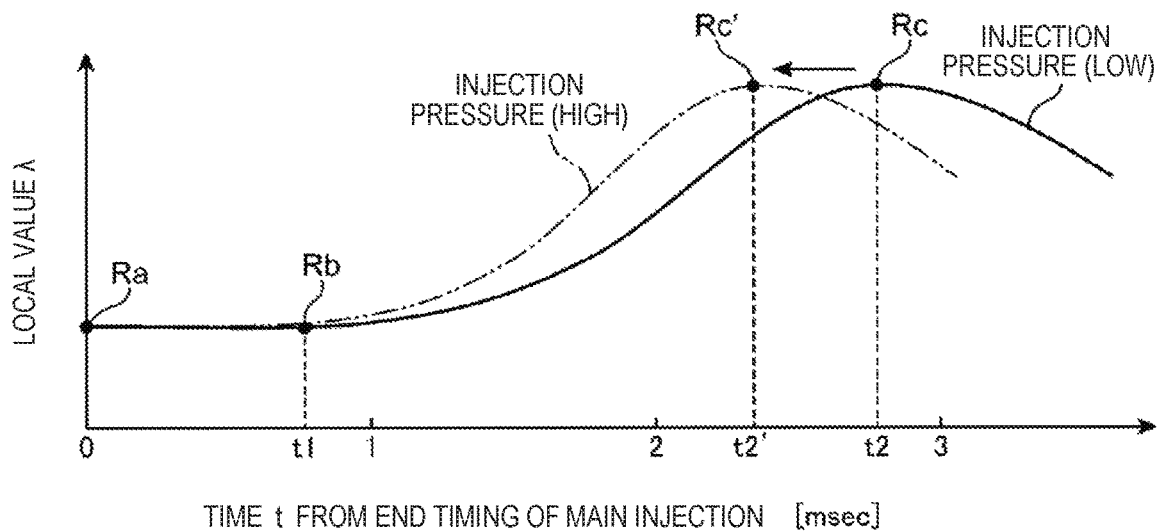
FIG. 9 is a graph illustrating a temporal change in an oxygen concentration at a specific position (turning reference point) inside the cavity.

FIG. 9 is a graph illustrating a temporal change in the oxygen concentration at the turning reference point Z. In detail, in this graph, as a parameter representing the oxygen concentration at the turning reference point Z, a local value λ which is a value obtained by dividing a local air fuel ratio at the turning reference point Z by a stoichiometric air fuel ratio is adopted, and this local value λ is taken as the vertical axis. The oxygen concentration is higher as the local value λ increases. Moreover, t of the horizontal axis is time (msec) from the end timing of the main injection Jm.

As illustrated by a solid-line waveform in the graph of FIG. 9, the local value λ at the turning reference point Z changes periodically so that it becomes larger as the time passes from the end timing of the main injection Jm (t=0), and it then falls again after becoming the maximum. In detail, the local value λ is very small (point Ra) at the end timing of the main injection Jm (t=0), and then begins (point Rb) notably rising after a timing t1. Further, the local value λ becomes the maximum at a timing t2 after the timing t1 (point Rc), and, after that, it gradually falls. In this case, the point Ra at t=0 corresponds to the state of FIG. 8A, the point Rb at t=t1 corresponds to the state of FIG. 8B, and the point Rc at t=t2 corresponds to the state of FIG. 8C.

As described above, the local value λ (or the oxygen concentration) at the turning reference point Z changes periodically with the turning flow of the fuel spray Fm inside the first cavity part 51. As the premise of the phenomenon, at Step S5 of FIG. 7, the variation of the oxygen concentration at the turning reference point Z is assumed to be a given periodic function, and its frequency (turning frequency) and initial phase are calculated using a given expression. A method of calculating the turning frequency and the initial phase will be described in detail later.

Figure 10:
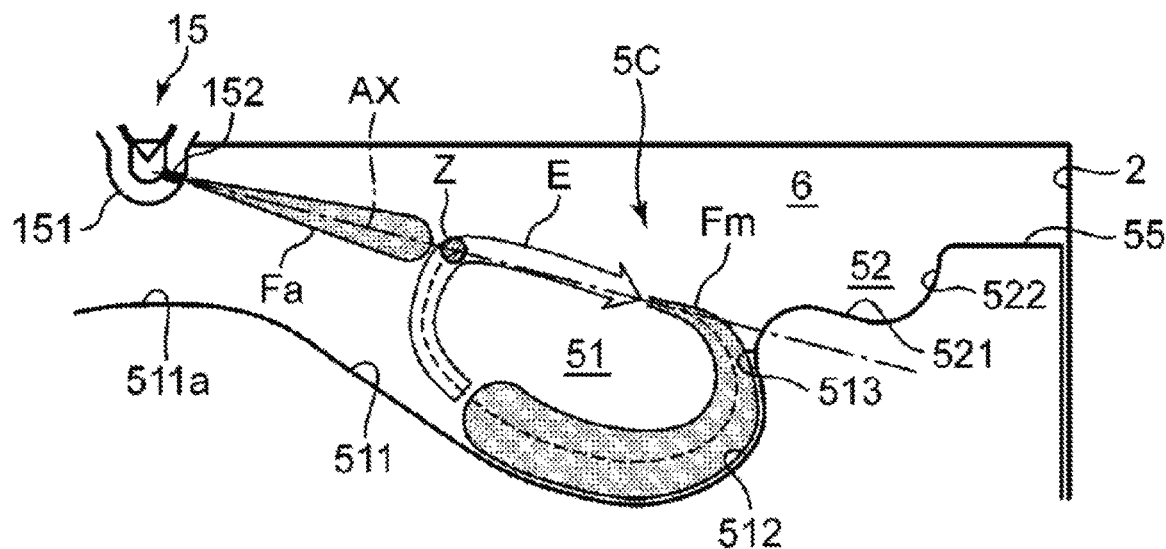
FIG. 10 is a view schematically illustrating a spatial relationship between the fuel spray by the main injection and the fuel spray by the subsequent after-injection.

Next, the ECU 70 determines the injection interval period Ti which is the period of time from the end of the main injection Jm to the start of the after-injection Ja based on the turning frequency and the initial phase which are calculated at Step S5 (Step S6). As illustrated in FIG. 10, this injection interval period Ti is set as a time so that a tip end of a fuel spray Fa by the after-injection Ja reaches the turning reference point Z when the oxygen concentration at the turning reference point Z becomes the highest. Below, the timing at which the oxygen concentration at the turning reference point Z becomes the highest (the timing t2 in the case of the solid-line waveform in FIG. 9) is referred to as "the oxygen arrival timing." This oxygen arrival timing corresponds to a timing at which the intermediate part of the clean airflow E passes through the turning reference point Z as illustrated in FIG. 8C or FIG. 10. In other words, the injection interval period Ti is set so that the timing at which the tip end of the fuel spray Fa by the after-injection Ja reaches the turning reference point Z corresponds to the timing when the intermediate part of the clean airflow E reaches the turning reference point Z.

Next, the ECU 70 causes the injector 15 to perform the pre-injection Jp and the main injection Jm (Step S7). Note that, here, the pre-injection Jp and the main injection Jm are performed according to the injection pattern determined based on the given map data at Step S2 (the injection pattern in which the injection amount and the injection timing of each of the main injection and the pre-injection are defined).

Next, the ECU 70 determines whether an elapsed time from the end of the main injection Jm performed at Step S7 reaches the injection interval period Ti determined at Step S6 (Step S8).

If it is determined as YES at Step S8, and it is confirmed that the injection interval period Ti has lapsed from the end of the main injection Jm, the ECU 70 then causes the injector 15 to start the after-injection Ja (Step S9). Therefore, as illustrated in FIG. 10, the timing at which the tip end of the fuel spray Fa by the after-injection Ja reaches the turning reference point Z on the injection axis AX can match with the oxygen arrival timing at which the oxygen concentration at the turning reference point Z becomes high. This leads to raising the air utilization factor when the fuel injected by the after-injection Ja combusts. Note that an injection amount determined based on the given map data at Step S2 is adopted as the injection amount of the after-injection Ja at Step S9.

<Method of Calculating Turning Frequency and Initial Phase>

Next, the method of calculating the turning frequency and the initial phase at Step S5 is described in detail. As described above, the turning frequency and the initial phase are based on the phenomenon in which the fuel spray Fm by the main injection Jm carries out the turning flow inside the first cavity part 51, and are the frequency and the initial phase based on the assumption of the change in the oxygen concentration at the turning reference point Z in accordance with the turning flow being the periodic function. Here, if the periodic function representing the change in the oxygen concentration is x(t), x(t) is schematically defined by the following Formula (1).

$$x(t)=\cos(2\pi ft-\varphi) \quad (1)$$

Here, f is the turning frequency and φ is the initial phase.

Further, as illustrated in FIG. 8A, a length of the fuel spray Fm is a fuel-spray length L, and a velocity of the fuel spray Fm flowing (turning) is a turning velocity V. Moreover, as illustrated in FIG. 8B, a traveling distance of the fuel spray Fm following a broken-line path from the turning reference point Z and returning to the turning reference point Z (a distance of the broken-line path) is a turning distance D. The turning frequency f and the initial phase φ can be expressed by the following Formula (2) using the fuel-spray length L, the turning velocity V, and the turning distance D.

$$f = V/D$$

$$\varphi = 2\pi \times L/D \quad (2)$$

That is, the turning frequency f is equal to a value obtained by dividing the turning velocity V by the turning distance D, and the initial phase φ is equal to a constant multiplication of a value obtained by dividing the fuel-spray length L by the turning distance D.

In order to obtain the turning frequency f and the initial phase φ based on Formula (2), it is necessary to know the turning velocity V, the turning distance D, and the fuel-spray length L. According to the knowledge by the present inventors, these values (V, D, L) can by expressed by a function of a plurality of parameters selected from the main injection amount (the injection amount of the main injection Jm), the injection pressure, the intake pressure, the engine speed, the engine water temperature, and the fuel temperature, like the following Formula (3).

$V=F1$(main injection amount,injection pressure,intake pressure);

$D=F2$(main injection amount,injection pressure,intake pressure,engine speed); and $L=F3$(main injection amount,injection pressure,intake pressure,engine speed,water temperature, fuel temperature) \quad (3)

That is, the turning velocity V is a function of the main injection amount, the injection pressure, and the intake pressure as parameters (variables), the turning distance D is a function of the main injection amount, the injection pressure, the intake pressure, and the engine speed as parameters, and the fuel-spray length L is a function of the main injection amount, the injection pressure, the intake pressure, the engine speed, the engine water temperature, and the fuel temperature as parameters.

Figure 11A:
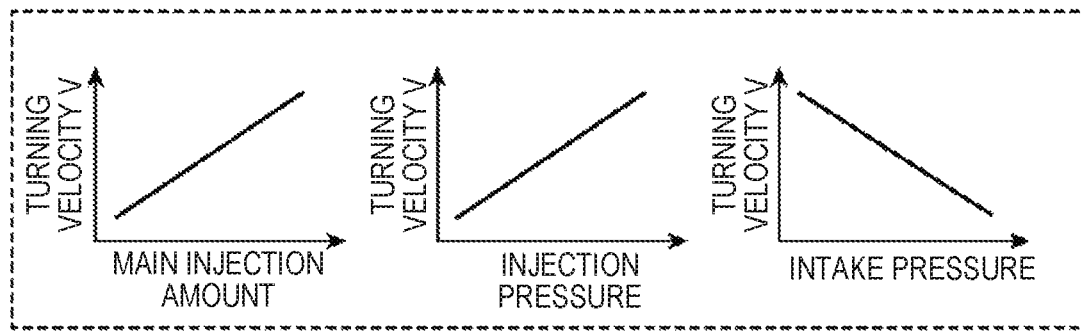
FIGS. 11A to 11C are graph groups illustrating that a turning flow of the fuel spray by the main injection changes according to various parameters, where
Figure 11B:
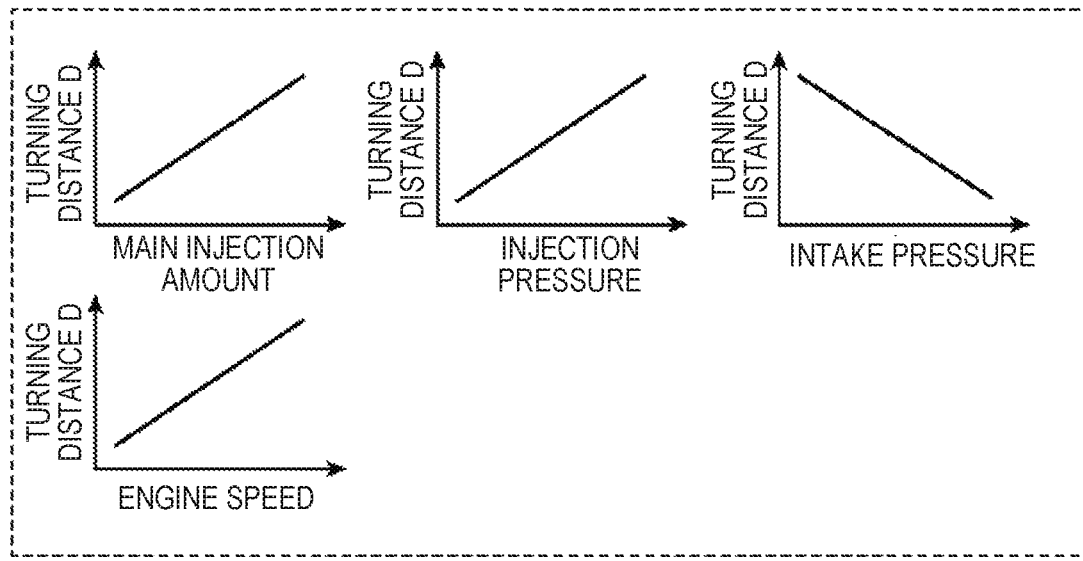
Figure 11C:
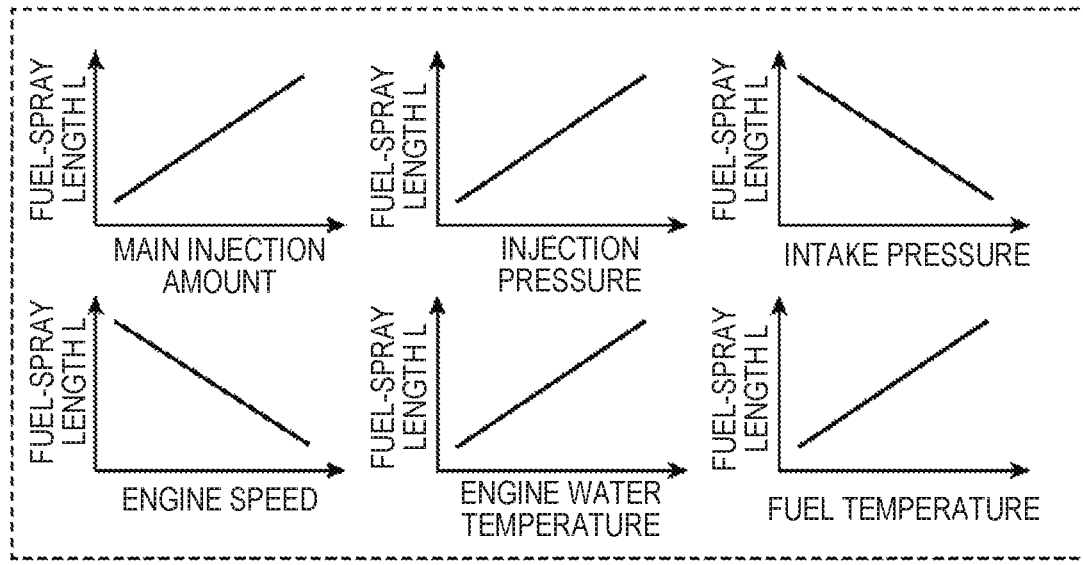

FIGS. 11A to 11C are graph groups illustrating an outline of the function of Formula (3), where FIG. 11A illustrates a relationship between the turning velocity V and each parameter, FIG. 11B illustrates a relationship between the turning distance D and each parameter, and FIG. 11C illustrates a relationship between the fuel-spray length L and each parameter.

As illustrated in FIG. 11A, the turning velocity V becomes faster as the injection amount of the main injection Jm increases, becomes faster as the injection pressure of fuel increases, and becomes slower as the intake pressure increases. As illustrated in FIG. 11B, the turning distance D becomes longer as the injection amount of the main injection Jm increases, becomes longer as the injection pressure of fuel increases, becomes shorter as the intake pressure increases, and becomes longer as the engine speed increases. As illustrated in FIG. 11C, the fuel-spray length L becomes longer as the injection amount of the main injection Jm increases, becomes longer as the injection pressure of fuel increases, becomes shorter as the intake pressure increases, becomes shorter as the engine speed increases, becomes longer as the engine water temperature increases, and becomes longer as the fuel temperature increases. Note that each graph of FIGS. 11A to 11C illustrates a change in V, D, and L which is obtained when the parameter indicated on the horizontal axis changes independently (when the other parameters are constant). Moreover, although each graph is a linear graph indicating a relationship of a simple direct proportion or inverse proportion, it is only illustrated schematically and does not necessarily become the linear graph.

At Step S5, the turning frequency f and the initial phase φ are calculated by the given calculation using the above knowledge. That is, at Step S5, the ECU 70 calculates the turning velocity V, the turning distance D, and the fuel-spray length L by substituting the information including the injection pressure, the intake pressure, the engine speed, the engine water temperature, and the fuel temperature which are acquired at Step S4, and the injection amount of the main injection Jm determined at Step S2 into the expression corresponding to Formula (3) (or FIG. 11) stored beforehand. Then, the turning frequency f (=V/D) and the initial phase φ (=2π×L/D) are calculated by substituting the calculated values (V, D, L) into the expression corresponding to Formula (2) stored beforehand.

<Method of Calculating Injection Interval Period>

Next, a method of calculating the injection interval period Ti at Step S6 is described in detail. As described above, In order to calculate the injection interval period Ti, it is necessary to identify the oxygen arrival timing which is a timing at which the intermediate part of the clean airflow E illustrated in FIGS. 8A to 8C reaches the turning reference point Z (the timing at which the oxygen concentration at the turning reference point Z becomes the highest). This oxygen arrival timing corresponds to a timing at which the periodic function x(t) illustrated by Formula (1) becomes the maximum (=1). In this case, since x(t) is a cosine function, x(t)=1 when the member of (2πft−φ) in Formula (1) becomes any one of 0, 2π, 4π, . . . . Therefore, the oxygen arrival timing can be expressed by the following Formula (4).

$$t=(\varphi+n\pi)/2\pi f(n=0,2,4,\ldots) \quad (4)$$

That is, the oxygen arrival timing is a timing at which t which is the elapsed time from the end of the main injection Jm satisfies the relationship of Formula (4), and can be expressed by a function where only the turning frequency f and the initial phase φ are variables.

According to Formula (4), the oxygen arrival timing becomes earlier as the turning frequency f increases, and it is delayed as the initial phase φ increases.

Here, the oxygen arrival timing based on Formula (4) periodically (repeatedly) appears corresponding to the change in n (0, 2, 4, . . . ) according to the calculation. On the other hand, in terms of fuel efficiency, it is desirable for the timing of the after-injection Ja to be as earlier as possible. That is, in Formula (4), it is desirable to identify t when n=0, i.e., an oxygen arrival timing (t=φ/2πf) which appears first among the oxygen arrival timings appearing periodically, and to determine the start timing of the after-injection Ja based on the identified result.

At Step S6, the injection interval period Ti is calculated by the given calculation using the above knowledge. That is, at Step S6, the ECU 70 calculates the oxygen arrival timing by substituting the turning frequency f and the initial phase φ calculated at Step S5 into the expression corresponding to Formula (4) stored beforehand. At this time, n in Formula (4) is set to 0 in principle, and t=φ/2πf is calculated as the oxygen arrival timing. This oxygen arrival timing (φ/2πf) is a timing at which the oxygen concentration at the turning reference point Z after the end of the main injection Jm first becomes the maximum, and corresponds to t2 of the solid-line waveform in FIG. 9. Then, the ECU 70 determines the injection interval period Ti so that the fuel spray Fa by the after-injection Ja reaches the turning reference point Z at the calculated oxygen arrival timing (e.g., the timing t2 in FIG. 9).

In order to make the fuel spray Fa reach the turning reference point Z at the oxygen arrival timing as described above, it is necessary to start the after-injection Ja slightly before the oxygen arrival timing. That is, when a time required for the fuel spray Fa by the after-injection Ja to move from the nozzle hole 152 to the turning reference point Z, i.e., a time required for the tip end of the fuel spray Fa to reach the turning reference point Z after the after-injection Ja is started is a fuel-spray arrival required time, it is necessary to set the timing obtained by making the oxygen arrival timing earlier by the fuel-spray arrival required time as the start timing of the after-injection Ja. Thus, the ECU 70 calculates a value obtained by subtracting the fuel-spray arrival required time from a time required for reaching the oxygen arrival timing calculated as described above, in other words, a time required until the oxygen concentration at the turning reference point Z becomes the highest (t2 (msec) in the case of the solid-line waveform in FIG. 9) after the main injection Jm is finished, as the injection interval period Ti. Note that the fuel-spray arrival required time (the time required for the fuel spray Fa by the after-injection Ja to move from the nozzle hole 152 to the turning reference point Z) can be calculated each time, but a given fixed value may also be used. This is because the fuel-spray arrival required time is a comparatively short period of time, and it is also thought that a variation thereof according to a difference in the condition is small.

Figure 12:
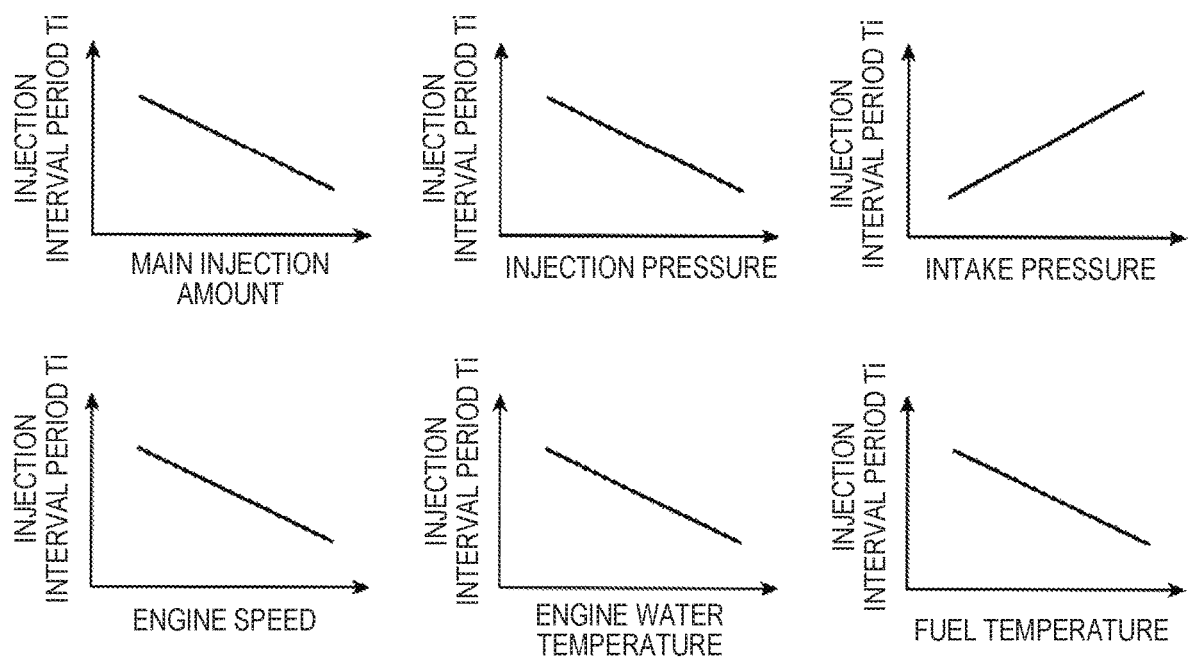
FIG. 12 is a graph group representing a relationship between an injection interval period which is a time from the end of the main injection to an initiation of the after-injection, and each parameter of the main injection amount, the injection pressure, the intake pressure, the engine speed, the engine water temperature, and the fuel temperature.

FIG. 12 is a graph group illustrating relationships between the injection interval period Ti calculated as described above, and the parameters including the main injection amount, the injection pressure, the intake pressure, the engine speed, the engine water temperature, and the fuel temperature. As illustrated in this figure, the injection interval period Ti becomes shorter as the injection amount of the main injection Jm increases, becomes shorter as the injection pressure of fuel increases, becomes longer as the intake pressure increases, becomes shorter as the engine speed increases, becomes shorter as the engine water temperature increases, and becomes shorter as the fuel temperature increases. Note that each graph illustrated in FIG. 12 indicates a change in the injection interval period Ti obtained when the parameter illustrated on the horizontal axis is changed independently (when the other parameters are constant). Moreover, although each graph is a linear graph representing a relationship of a simple direct proportion or inverse proportion, it is only illustrated schematically and does not necessarily become the linear graph.

<Example Setting of Injection Interval Period>

Next, example setting of the injection interval period Ti obtained as a result of the above control or calculation is described.

(Injection Interval Period in Steady Operation)

First, a concrete example of the injection interval period Ti which is set during a steady operation is described. As illustrated in parts (a) and (b) of FIG. 6, in this embodiment, three pre-injections Jp, one main injection Jm, and one after-injection Ja are performed in both the two representative operating points (the first operating point C1 and the second operating point C2) in the diffuse-combustion range A1 (FIG. 5). In this case, although the injection amount of the main injection Jm is the same at the first operating point C1 and the second operating point C2, the injection pressure of fuel is higher at the second operating point C2 where the load is higher than at the first operating point C1 where the load is lower (see Table 1, etc. illustrated previously). As a result, as illustrated in parts (a) and (b) of FIG. 6, the injection interval period Ti at the second operating point C2 with the high load is shorter than the injection interval period Ti at the first operating point C1 with the low load.

That is, when comparing the steady operation of the engine at the first operating point C1 with the steady operation of the engine at the second operating point C2, only two ("the injection pressure" and "the intake pressure") among the six parameters illustrated in the graph group of FIG. 12 (the injection amount of the main injection Jm, the injection pressure, the intake pressure, the engine speed, the engine water temperature, and the fuel temperature) are different, and the remaining parameters (the main injection amount, the engine speed, the engine water temperature, and the fuel temperature) are the same. It is found that the injection pressure has a larger effect to the injection interval period Ti, when only "the injection pressure" and "the intake pressure" are different. Here, according to the graph of the injection pressure in FIG. 12, the injection interval period Ti becomes shorter as the injection pressure increases. If this is put in another way with reference to FIG. 9, the timing at which the local value λ at the turning reference point Z becomes the maximum (the oxygen arrival timing) becomes earlier as the injection pressure increases, and, as a result, the injection interval period Ti becomes shorter. That is, since the oxygen arrival timing changes from the timing t2 corresponding to the point Rc on the solid-line waveform to the timing t2' corresponding to a point Rc' on a waveform of a two-dot chain line according to the increase in the injection pressure, the injection interval period Ti becomes shorter accordingly. This tendency becomes dominant at the first and second operating points C1 and C2, and as a result, as illustrated in parts (a) and (b) of FIG. 6, the injection interval period Ti at the second operating point C2 with the high load becomes shorter than the injection interval period Ti at the first operating point C1 with the low load. Note that although the horizontal axis is the crank angle and is not time in parts (a) and (b) of FIG. 6, since the engine speed is the same at the first and second operating points C1 and C2, the length in the horizontal axis direction can be considered as the length in time as-is.

(Fuel Injection During Accelerating Operation)

Next, a concrete example of the injection interval period Ti set during the accelerating operation is described. Here, as one example, a change in the injection interval period Ti, when the engine operating point changes like an arrow B in the diffuse-combustion range A1 (FIG. 5), and the injection amount of the main injection Jm is increased, is described. Note that in the example of FIG. 5, although the arrow B is an arrow of which the operating point after acceleration matches with the second operating point C2, this is simply an example, and the injection interval period Ti changes with the tendency similar to the following, as long as it is an acceleration in the diffuse-combustion range A1 and the injection amount of the main injection Jm increases.

Figure 13:
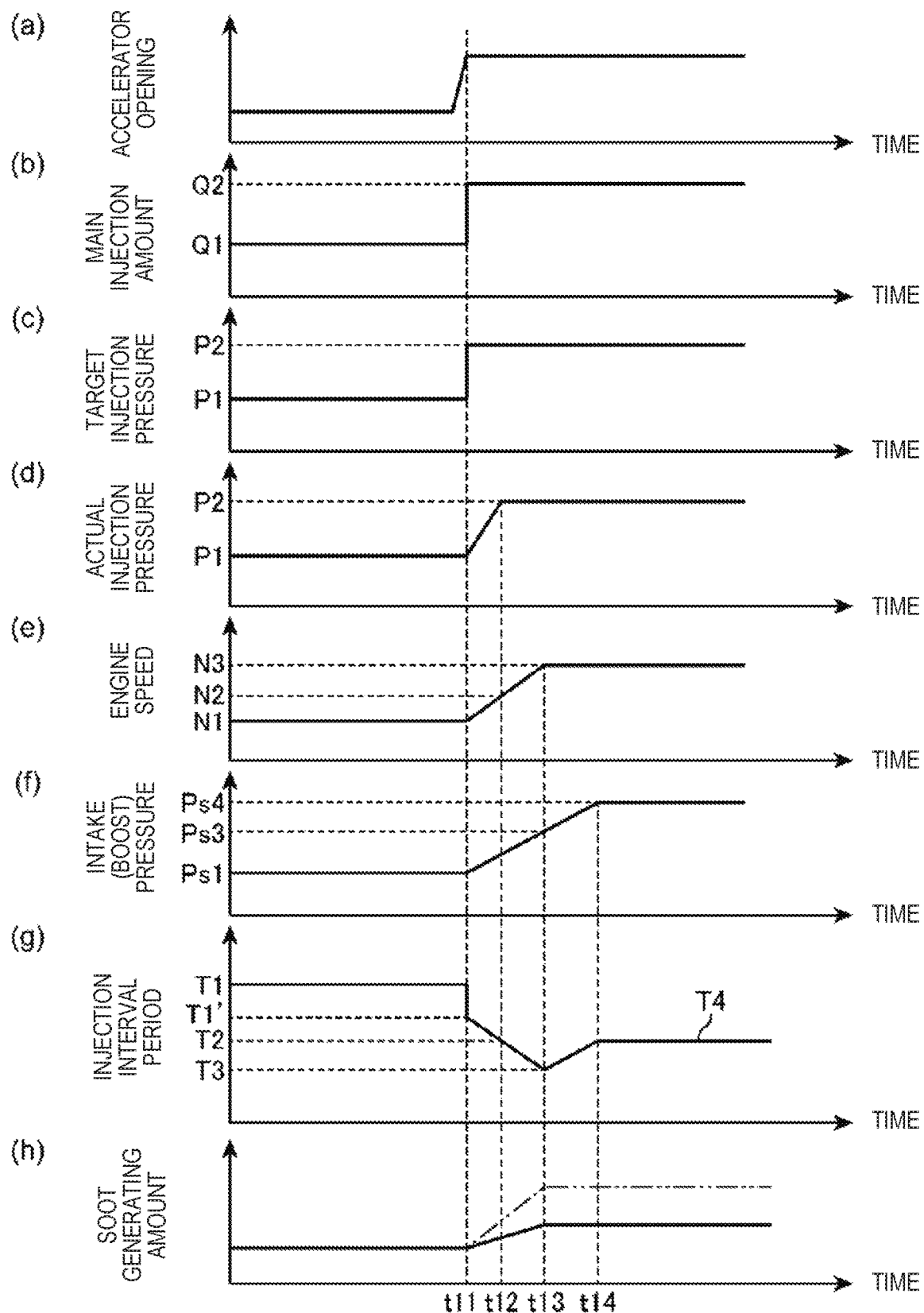
FIG. 13 is a time chart illustrating a temporal change in various properties during an accelerating operation in the diffuse-combustion range.

FIG. 13 is a time chart illustrating a temporal change in various properties during the accelerating operation in the diffuse-combustion range A1. A timing t11 in this figure is a timing at which the accelerator opening increases to a given opening by the driver further depressing the accelerator pedal (see chart (a)). By the increase in the accelerator opening at this timing t11, the engine load (demanded torque) increases in a stepped fashion, and the injection amount of the main injection Jm and the target injection pressure of fuel also increase in a stepped fashion accordingly. That is, the injection amount of the main injection Jm changes from Q1 to Q2 larger than Q1 in a stepped fashion (see chart (b)), and the target injection pressure of fuel changes from P1 to P2 larger than P1 in a stepped fashion (see chart (c)). On the other hand, an actual injection pressure gradually increases corresponding to the operation of the fuel pressure regulator 16, and it reaches P2 which is the same value as the target injection pressure after the increase at a timing t12 which is later than the timing t11 (see chart (d)).

The increase in the injection amount of the main injection Jm after the timing t11 increases the engine output torque and gradually increases the engine speed. In the illustrated example, the engine speed continues increasing to a timing t13 which is later than the timing t12 at which the increase in the actual injection pressure is finished, and finishes the increase at this timing. That is, the engine speed increases from N1 to N2 which is faster than N1, from the timing t11 to the timing t12, and further increases to N3 which is faster than N2, from the timing t12 to the timing t13 (see chart (e)).

Moreover, since the increase in the output torque (heat production) and the engine speed improves the boosting performance of the turbocharger 36, the intake pressure (boost pressure) gradually increases after the timing t11. In the illustrated example, the intake pressure continues rising up to a timing t14 which is later than the timing t13 at which the increase in the engine speed is finished, and finishes the increase at this timing. That is, the intake pressure increases from Ps1 to Ps3 which is higher than Ps1 from the timing t11 to the timing t13, and further increases to Ps4 which is higher than Ps3 from the timing t13 to the timing t14 (see chart (f)).

By the temporal change in the injection amount, the injection pressure, the engine speed, and the intake pressure as described above, the injection interval period Ti which is the time from the end of the main injection Jm to the start of the after-injection Ja changes like chart (g). That is, the injection interval period Ti drops in a stepped fashion from T1 to T1' at the timing t11, gradually drops from T1' to T2 from the timing t11 to the timing t12, gradually drops from T2 to T3 from the timing t12 to the timing t13, and gradually increases from T3 to T4 from the timing t13 to the timing t14.

The stepped drop of the injection interval period Ti at the timing t11 among the changes described above is caused by the injection amount of the main injection Jm illustrated in chart (b) increased in the stepped fashion at the timing t11 from Q1 to Q2. That is, as illustrated in FIG. 12, since the increase in the injection amount of the main injection Jm shortens the injection interval period Ti, if the injection amount increases in a stepped fashion at the timing t11, the injection interval period Ti is shortened in a stepped fashion corresponding to the increase in the injection amount.

The gradual decrease in the injection interval period Ti from the timing t11 to the timing t12 is caused mainly by the injection pressure of fuel (actual injection pressure) illustrated in chart (d) gradually increased from P1 to P2 from the timing t11 to the timing t12. That is, as illustrated in FIG. 12, since the increase in the injection pressure shortens the injection interval period Ti, if the injection pressure gradually increases from the timing t11 to the timing t12, the injection interval period Ti is gradually shortened corresponding to the gradual increase in the injection pressure.

The gradual decrease in the injection interval period Ti from the timing t12 to the timing t13 is mainly caused by the engine speed illustrated in chart (e) gradually increased from N2 to N3 from the timing t12 to the timing t13. That is, as illustrated in FIG. 12, since the increase in the engine speed shortens the injection interval period Ti, if the engine speed gradually increases from the timing t12 to the timing t13, the injection interval period Ti is gradually shortened corresponding to the gradual increase in the engine speed.

The gradual increase in the injection interval period Ti from the timing t13 to the timing t14 is caused by the intake pressure (boost pressure) illustrated in chart (f) gradually increased from Ps3 to Ps4 from the timing t13 to the timing t14. That is, as illustrated in FIG. 12, since the increase in the intake pressure lengthens the injection interval period Ti, if the intake pressure gradually increases from the timing t13 to the timing t14, the injection interval period Ti is gradually lengthened corresponding to the gradual increase in the intake pressure.

Figure 14:
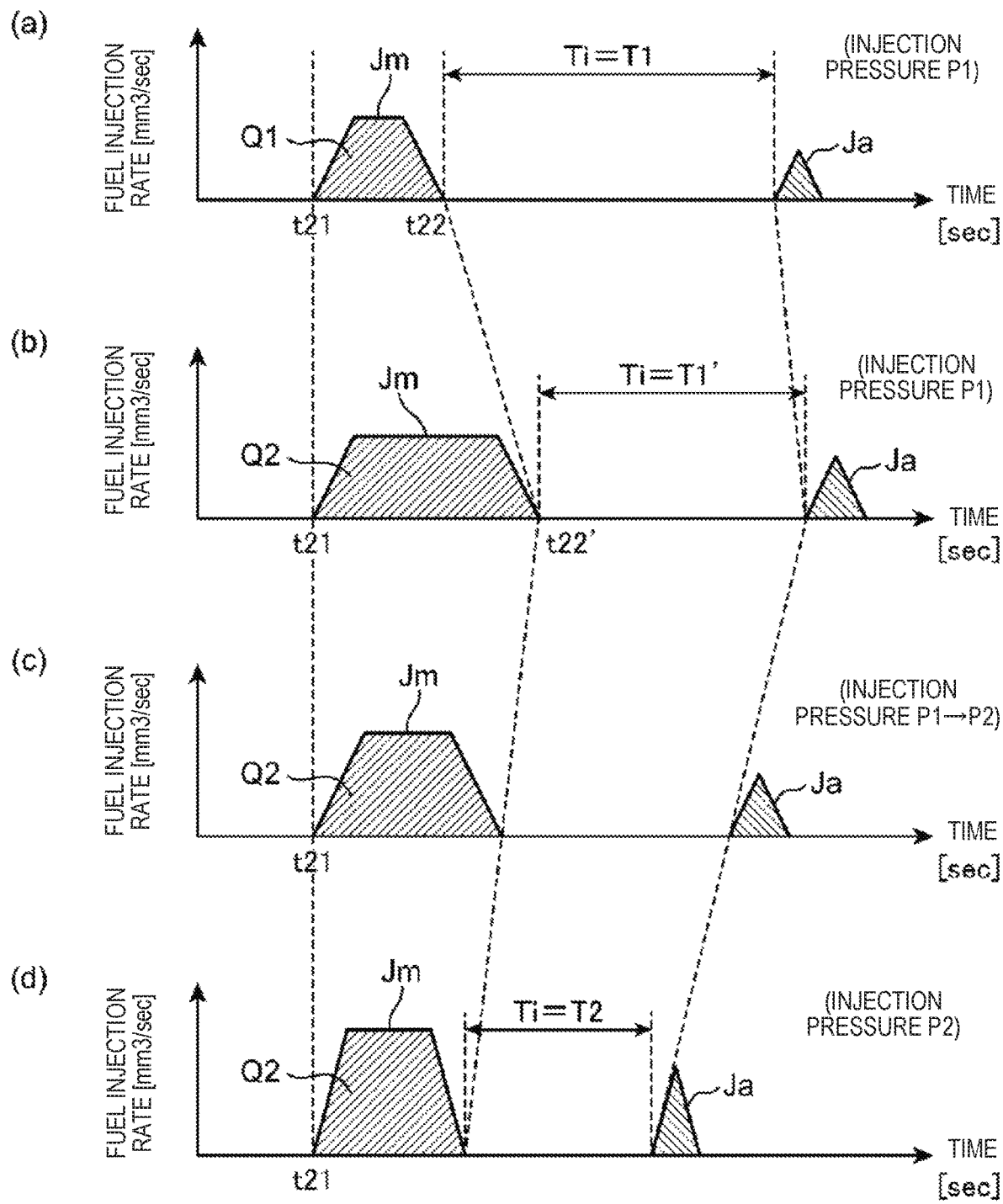
FIG. 14 is a time chart in which the injection amount and the injection interval period which change by the accelerating operation are expressed by a change in an injection waveform (injection pattern).

FIG. 14 is a time chart in which the injection amount and the injection interval period Ti changing from the timing t11 to the timing t12 in FIG. 13 are expressed by a change in an injection waveform (injection pattern), where the horizontal axis is time (sec) and the vertical axis is a fuel injection rate (mm³/sec) on the basis of time.

Chart (a) of FIG. 14 illustrates an injection waveform immediately before an acceleration is started, and corresponds to the state immediately before the timing t11 in FIG. 13. Chart (b) of FIG. 14 illustrates an injection waveform immediately after the acceleration is started, and corresponds to the state immediately after the timing t11 in FIG. 13. As illustrated in FIG. 13, since the injection amount of the main injection Jm is increased from Q1 to Q2 bordering the timing t11, the injection waveform is switched from chart (a) to chart (b) in FIG. 14 corresponding to the increase in the injection amount, and the injection period of the main injection Jm is extended. That is, in chart (a) illustrating the state immediately before the acceleration is started, the main injection Jm is performed from a timing t21 to a timing t22, and on the other hand, in chart (b) illustrating the state immediately after the acceleration is started, the end timing of the main injection Jm is delayed to a timing t22' while the start timing is fixed at the timing t21, and therefore, the injection period of the main injection Jm is extended more than the case in chart (a). By this extension of the injection period, the injection amount of the main injection Jm is increased from Q1 to Q2. Below, Q1 which is the injection amount before the increase is referred to as "the first injection amount," and Q2 which is the injection amount after the increase as "the second injection amount."

Here, when the injection amount of the main injection Jm is increased from the first injection amount Q1 to the second injection amount Q2 bordering the timing t11 as described above, the injection pressure of fuel begins increasing accordingly (see chart (d) in FIG. 13). That is, a control in which the injection pressure of fuel is increased from the pressure P1 which suits the injection amount before the increase (hereinafter, referred to as "the first injection pressure") to the pressure P2 which suits the injection amount after the increase (hereinafter, referred to as "the second injection pressure"). However, the injection pressure is hardly increased immediately after the timing t11, and the substantial injection pressure remains at the first injection pressure P1. Therefore, it is essential to extend the injection period in order to increase the injection amount of fuel. That is why the injection period (t21-t22') of the main injection Jm in Chart (b) of FIG. 14 is longer than the injection period (t21-t22) in Chart (a). In other words, in Chart (b) of FIG. 14, in order to increase the injection amount of the main injection Jm while the injection pressure is not substantially increased, the injection period is extended.

As described above, the change seen in FIG. 14 from chart (a) to chart (b) is mainly an increase in the injection amount of the main injection Jm, and the injection pressure of fuel does not substantially change. Therefore, the injection interval period Ti which is the time from the end of the main injection Jm to the start of the after-injection Ja becomes shorter in chart (b) after the injection amount is increased than in chart (a) before the injection amount is increased. That is, the injection interval period Ti becomes shorter due to the effect of the increase in the injection amount, and it changes from T1 to T1' which is shorter than T1 from chart (a) to chart (b).

The injection pressure of fuel gradually increases toward the second injection pressure P2 after the timing of chart (b) in FIG. 14. A state in which the injection pressure is in the middle of increasing is illustrated in chart (c), and a state in which the injection pressure completes to increase to the second injection pressure P2 is illustrated in chart (d) (the timing t12 in FIG. 13). In other words, the period from chart (b) to chart (d) in FIG. 14 is a period during which the actual injection pressure of fuel is short with respect to the target injection pressure (i.e., the second injection pressure P2), and, below, this is referred to as "the fuel pressure insufficient period." As may be understood by comparing charts (b), (c), and (d), during this fuel pressure insufficient period, the injection period of the main injection Jm is gradually shortened, and the injection interval period Ti is also gradually shortened.

The injection period of the main injection Jm is gradually shortened during the fuel pressure insufficient period from chart (b) to chart (d) in FIG. 14, because an amount of fuel which can be injected per unit time in accordance with the increase in the injection pressure during the same period increases, and therefore, a time required for injecting the same amount of fuel becomes shorter. That is, since the injection amount of the main injection Jm during the fuel pressure insufficient period is constant at the second injection amount Q2, the time required for injecting the second injection amount Q2 becomes shorter by the increase in the injection pressure. Therefore, the injection period of the main injection Jm becomes gradually shorter from chart (b) to chart (d). Moreover, since the injection pressure increases while the injection amount is constant as described above, the increase in the injection pressure shortens the injection interval period Ti. This is why the injection interval period Ti is gradually reduced from T1' to T2 from chart (b) to chart (d).

<Operation and Effects>

As described above, in this embodiment, during the operation in the diffuse-combustion range A1 of the diesel engine including the piston 5 where the reentrant type cavity 5C is formed in the crown surface 50, the injector 15 is controlled so that the main injection Jm in which the largest ratio of fuel among the total injection amount of fuel in one combustion cycle is injected into the first cavity part 51, and the after-injection Ja in which the smaller amount of fuel than the main injection Jm is injected at the given timing later than the main injection Jm during an expansion stroke are performed. The injection interval period Ti which is the time from the end of the main injection Jm to the start of the after-injection Ja becomes shorter as the injection pressure of fuel increases. According to such a configuration, the air utilization factor of fuel which is injected by the after-injection Ja is increased to fully suppress the generation of soot, while maintaining the appropriate fuel efficiency.

That is, as illustrated in FIGS. 8A to 8C, the fuel spray Fm of fuel injected by the main injection Jm circulates so as to form the vertical vortex along the wall surfaces of the lip part 513, the peripheral part 512, and the bottom part 511 of the first cavity part 51, and then returns to the turning reference point Z on the injection axis AX (the extension of the center axis of the nozzle hole 152) of the injector 15. The oxygen arrival timing at which the oxygen concentration at the turning reference point Z becomes dense is the timing at which the clean airflow E (the airflow with high oxygen content) generated so as to follow the rear end of the fuel spray Fm passes through the turning reference point Z. Therefore, if the fuel spray Fa by the after-injection Ja can reach the turning reference point Z at the oxygen arrival timing, the air utilization factor of fuel injected by the after-injection Ja can be increased (see FIG. 10). On the other hand, as the result of the research by the present inventors, it is found out that the oxygen arrival timing becomes earlier as the injection pressure of fuel increases, as illustrated in FIG. 9. As the control taking in consideration of this regard, in this embodiment, since the injection interval period Ti which is the time from the end of the main injection Jm to the start of the after-injection Ja is adjusted so that it becomes shorter as the injection pressure of fuel increases, the fuel spray Fa by the after-injection Ja can reach the turning reference point Z at the suitable timing which suits the tendency of the oxygen arrival timing as described above (i.e., the timing at which the oxygen concentration at the turning reference point Z becomes dense), and therefore, the air utilization factor of the fuel spray Fa can be increased. Therefore, as illustrated by the solid-line waveform in chart (h) of FIG. 13, the generation of soot accompanying combustion can be effectively reduced, as compared with the case where the injection interval period Ti is fixed (illustrated by the two-dot chain line).

Moreover, when the injection interval period Ti is adjustable according to the injection pressure as described above, the injection timing of the after-injection Ja can be made earlier depending on the condition and the engine fuel efficiency can be improved, as compared with the case where the injection interval period Ti is fixed. For example, when the injection interval period Ti is set constant regardless of the injection pressure, it is necessary to start the after-injection Ja after the temperature of the combustion chamber 6 is fully dropped, that is, after a comparatively long period of time passes from the end of the main injection Jm (an expansion stroke progresses to some extent) so that the generating amount of soot does not become excessive even if the injection pressure is high or low. This decreases the rate used as the work among the combustion energy based on the after-injection Ja, and therefore, it causes the deterioration of the fuel efficiency. On the other hand, like this embodiment, when the injection interval period Ti is adjustable according to the injection pressure, the uniform delay of the start timing of the after-injection Ja becomes unnecessary as described above, and the injection timing of the after-injection Ja can be made earlier depending on the condition. This increases the rate of energy converted into the work among the combustion energy based on the after-injection Ja as much as possible, thereby improving the engine fuel efficiency.

In more detail, in this embodiment, when comparing the two operating points in the diffuse-combustion range A1 which are the same in the injection amount of the main injection Jm but are different in the injection pressure of fuel (i.e., the first operating point C1 and the second operating point C2 which are separated from each other in the load direction, the injection interval period Ti is controlled so that it becomes shorter during the operation at the second operating point C2 with high injection pressure (or load) than during the operation at the first operating point C1 with low injection pressure (or load) (see FIG. 6). According to such a configuration, at the first operating point C1 and the second operating point C2 which are different in the engine load (as a result, different in the total injection amount of fuel), the necessary amount of fuel can be efficiently injected at the injection pressure which is suitably adjusted by the fuel pressure regulator 16, and therefore, both the combustion controllability and fuel efficiency can be improved. Moreover, by adjusting the injection interval period Ti according to the injection pressure between the first operating point C1 and the second operating point C2, the after-injection Ja can be started at the suitable timing at which the high air utilization factor can be acquired, and therefore, the amount of soot can be reduced at both the operating points C1 and C2.

On the other hand, during the accelerating operation as illustrated by the arrow B in FIG. 5, that is, during the operation in which the operating point shifts in the direction in which the load increases in the diffuse-combustion range A1, the injector 15 is controlled so that the injection period of the main injection Jm becomes longer to increase the injection amount of the main injection Jm from the first injection amount Q1 to the second injection amount Q2, and the fuel pressure regulator 16 is driven so that the injection pressure of fuel begins to increase from the first injection pressure P1 toward the second injection pressure P2, as illustrated in charts (a) and (b) of FIG. 14. Then, until the injection pressure of fuel is increased to the second injection pressure P2, that is, during the fuel pressure insufficient period where the injection pressure of fuel becomes lower than the target pressure (the period from chart (b) to chart (d) in FIG. 14), the injector 15 is controlled so that the end timing of the main injection Jm becomes earlier and the injection interval period Ti becomes shorter as the injection pressure of fuel increases. According to such a configuration, even if the injection pressure immediately after the load is increased is insufficient, the amount of fuel which suits the load after the increase can be promptly supplied by the extension of the injection period to increase the output torque, thereby securing the appropriate output response to the acceleration demand. Moreover, during the fuel pressure insufficient period where the injection pressure is insufficient with respect to the target pressure (the second injection pressure P2) immediately after the injection amount is increased by the extension of the injection period, since the end timing of the main injection Jm is made earlier and the injection interval period Ti is shortened as the injection pressure increases, the start timing of the after-injection Ja can be appropriately controlled so that the air utilization factor of fuel increases, while maintaining the injection amount of the main injection Jm at the injection amount after the increase (the second injection amount Q2).

Moreover, in this embodiment, the injection pressure sensors SN5 are provided to the plurality of injectors 15 provided to the plurality of cylinders 2, respectively, and the injection interval period Ti of each cylinder 2 is determined based on the injection pressure detected by the corresponding injection pressure sensor SN5 at the close timing of the intake valve 11 (IVC) of the cylinder 2 (i.e., the injection pressure sensor SN5 provided to the injector 15 for the cylinder 2 which reached IVC). According to such a configuration, the appropriate injection interval period Ti for increasing the air utilization factor can be calculated with sufficient accuracy based on the injection pressure which is actually detected by the injector 15 for an arbitrary cylinder 2 immediately before the fuel injection is started in the cylinder 2.

Moreover, in this embodiment, the main injection Jm is performed at the timing where the injection axis AX of the injector 15 intersects with the lip part 513 of the first cavity part 51, the oxygen arrival timing which is the time at which the clean airflow E returns to the turning reference point Z on the injection axis AX after the end of the main injection Jm is calculated based on the plurality of parameters including the injection pressure of fuel (the main injection amount, the injection pressure, the intake pressure, the engine speed, the engine water temperature, and the fuel temperature), and the injection interval period Ti is then determined based on the calculated oxygen arrival timing. According to such a configuration, the oxygen arrival timing can be calculated appropriately based on the knowledge acquired by the present inventors in which the oxygen arrival timing changes according to the specific parameter group including the injection pressure, and by adjusting the start timing of the after-injection Ja so that the fuel spray Fa by the after-injection Ja reaches the turning reference point Z at the calculated oxygen arrival timing, the air utilization factor of the fuel spray Fa can be increased to reduce the generating amount of soot.

<Modifications>

Although in the above embodiment, the present disclosure is applied to the diesel engine provided with the piston 5 where the vertical 2-step cavity 5C including the first cavity part 51 and the second cavity part 52 is formed in the crown surface 50, the diesel engine to which the present disclosure is applicable may be one provided with a piston in which a 1-step cavity is formed, instead of the 2-step cavity. That is, as long as the piston is at least formed with a reentrant type cavity corresponding to the first cavity part 51 among the cavity 5C of the piston 5 of the above embodiment, which has the mountain-shaped bottom part 511, the peripheral part 512 dented so as to be convex radially outward, and the lip part 513 protruded so as to be convex radially inward, the present disclosure is applicable to diesel engines provided with pistons having various shapes.

In the above embodiment, the injection pressure sensors SN5 are provided to the plurality of injectors 15 provided to the plurality of cylinders 2, respectively, and when the injector 15 injects fuel in one of the cylinders 2, the injection interval period Ti is determined based on the injection pressure detected by the injection pressure sensor SN5 provided to the injector 15 for the cylinder 2 at the IVC timing (the close timing of the intake valve). However, the method of determining the injection interval period Ti is not limited to this configuration. For example, an injection pressure sensor may be provided to the common rail 18 connected to the plurality of injectors 15 through the fuel feed pipes 17, and the injection interval period Ti may be determined based on the injection pressure detected by the injection pressure sensor. Moreover, the injection pressure used in order to determine the injection interval period Ti in the certain cylinder 2 is not limited to the injection pressure at the IVC timing of the cylinder 2, as long as the timing is before the injector 15 for this cylinder 2 injects fuel and after combustion in a previous cylinder 2 in the combustion order is finished.

In the above embodiment, the timing at which the intermediate part of the clean airflow E passes through the turning reference point Z on the injection axis AX, that is, the timing at which the oxygen concentration at the turning reference point Z becomes the highest, is defined as the oxygen arrival timing (e.g., the timing t2 in the solid-line waveform of FIG. 9), and the injection interval period Ti is adjusted so that the fuel spray Fa by the after-injection Ja reaches the turning reference point Z at the oxygen arrival timing. However, the oxygen arrival timing is not limited to the timing at which the oxygen concentration becomes the highest, as long as it is a timing at which any part of the main part of the clean airflow E except for the front end and the rear end passes through the turning reference point Z (a timing which clearly avoids the period during which the fuel spray Fm exists on the turning reference point Z). Particularly, since the stability of combustion based on the after-injection Ja tends to drop during a cold operation where the engine water temperature is sufficiently low, the start timing of the after-injection Ja may be required to be made as earlier as possible in terms of securing the combustion stability. In such a case, the injection interval period Ti may be adjusted so that the fuel spray Fa by the after-injection Ja reaches the turning reference point Z at a timing somewhat earlier than the timing at which the oxygen concentration becomes the highest.

Although in the above embodiment only one main injection Jm is performed in the mode where fuel is injected continuously throughout the given period including a compression top dead center, the number of injections is not limited to one, as long as a relatively large amount of fuel is injected at a timing where the fuel spray goes toward the lip part 513 of the cavity 5C (i.e., near a compression top dead center). For example, the main injection may be performed dividedly at a plurality of timings near a compression top dead center.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

2 Cylinder
5 Piston
5C Cavity
6 Combustion Chamber

15 Injector
16 Fuel Pressure Regulator
18 Common Rail (Pressure Accumulation Rail)
50 Crown Surface (of Piston)
70 ECU (Injection Controller)
152 Nozzle Hole (of Injector)
511 Bottom Part
512 Peripheral Part
513 Lip Part
SN5 Injection Pressure Sensor (Injection Pressure Acquirer)
A1 Diffuse-combustion Range (Given Operating Range)
AX Injection Axis
C1 First Operating Point
C2 Second Operating Point
E Clean Airflow
Fm Fuel Spray (by Main Injection)
Fa Fuel Spray (by After-injection)
Jm Main Injection
Ja After-injection
Q1 First Injection Amount
Q2 Second Injection Amount
P1 First Injection Pressure
P2 Second Injection Pressure
Ti Injection Interval Period
Z Turning Reference Point (Specific Position on Injection Axis)

What is claimed is:
1. A diesel engine system, comprising:
a cylinder;
a piston reciprocatably accommodated in the cylinder;
an injector configured to inject fuel containing diesel fuel into a combustion chamber that is a space above the piston;
an injection pressure acquirer configured to acquire an injection pressure of the fuel injected from the injector; and
an injection controller configured to control the injector so that the fuel is injected at a plurality of timings set from a compression stroke to an expansion stroke, during operation of the engine system in a given operating range,
wherein the piston has a cavity dented downwardly in a crown surface thereof, the cavity having, as wall surfaces defining the cavity:
 a bottom part formed so that a height thereof becomes lower while extending radially outward;
 a curved peripheral part formed radially outward of the bottom part and dented so as to be convex radially outward in a cross-sectional view including a cylinder axis; and
 a curved lip part formed above the peripheral part and protruding so as to be convex radially inward in the cross-sectional view,
wherein the injector is provided so as to inject the fuel obliquely downward and radially outward from a location of a ceiling part of the combustion chamber opposing to a center part of the cavity,
wherein the injection controller causes the injector to perform, during operation in the given operating range, a main injection in which a largest ratio of the fuel out of a total injection amount of the fuel in one combustion cycle is injected, the injected fuel being directed to the lip part to change a direction of at least a portion of the fuel to be downward from the lip part, and an after-injection in which a smaller amount of the fuel than the main injection is injected at a given timing later than the main injection in the expansion stroke, and
wherein an injection interval period that is a period of time from an end of the main injection to a start of the after-injection is shorter as the injection pressure of the fuel acquired by the injection pressure acquirer increases.

2. The diesel engine system of claim 1, further comprising a fuel pressure regulator configured to adjust the injection pressure of the fuel,
wherein, among two specific operating points in the given operating range with different loads, when an operating point with a lower load is a first operating point and an operating point with a higher load is a second operating point, the injection controller controls the injector and the fuel pressure regulator so that the injection amount of the main injection at the second operating point becomes the same as the injection amount of the main injection at the first operating point, and the injection pressure of the fuel at the second operating point becomes higher than the injection pressure of the fuel at the first operating point, and
wherein the injection interval period is shorter during operation at the second operating point than during operation at the first operating point.

3. The diesel engine system of claim 2,
wherein the injector has a nozzle hole used as an outlet of the fuel, and performs the main injection at a timing where an injection axis extending a center axis of the nozzle hole intersects with the lip part, and
wherein the injection controller calculates an oxygen arrival timing that is a timing at which a clean airflow with a high oxygen content returns to a specific position on the injection axis after the end of the main injection, based on a plurality of parameters including the injection pressure of the fuel, and determines the injection interval period based on the calculated oxygen arrival timing.

4. The diesel engine system of claim 1, further comprising a fuel pressure regulator configured to adjust the injection pressure of the fuel,
wherein the injection pressure acquirer is an injection pressure sensor configured to detect the injection pressure of the fuel,
wherein when a load increases in the given operating range, the injection controller increases the injection amount of the main injection from a first injection amount to a second injection amount by delaying the end timing of the main injection by the injector, while fixing the start timing of the main injection, and causes the fuel pressure regulator to start a control in which the injection pressure of the fuel is increased from a first injection pressure to a second injection pressure, and
wherein when a period after the injection amount of the main injection increases to the second injection amount until the injection pressure of the fuel increases to the second injection pressure is a fuel pressure insufficient period, the injection controller brings the end timing of the main injection earlier and shortens the injection interval period as the injection pressure of the fuel detected by the injection pressure sensor increases, during the fuel pressure insufficient period.

5. The diesel engine system of claim 4,
wherein a diesel engine of the diesel engine system is a multi-cylinder engine having a plurality of cylinders provided with a plurality of injectors, and the injection pressure sensor is one of a plurality of injection pressure sensors provided to the plurality of injectors, respectively, and wherein the injection controller determines the injection interval period of a specific cylinder, before the injector provided to the specific cylinder injects the fuel and after combustion in the last cylinder in a combustion order is finished, based on the injection pressure detected by the injection pressure sensor provided to the specific injector.

6. The diesel engine system of claim 5, wherein the injector has a nozzle hole used as an outlet of the fuel, and performs the main injection at a timing where an injection axis extending a center axis of the nozzle hole intersects with the lip part, and wherein the injection controller calculates an oxygen arrival timing that is a timing at which a clean airflow with a high oxygen content returns to a specific position on the injection axis after the end of the main injection, based on a plurality of parameters including the injection pressure of the fuel, and determines the injection interval period based on the calculated oxygen arrival timing.

7. The diesel engine system of claim 4, wherein a diesel engine of the diesel engine system is a multi-cylinder engine having a plurality of cylinders, wherein the injection pressure sensor is provided to a common pressure accumulation rail configured to pressurize and store the fuel to be supplied to the plurality of cylinders, and wherein the injection controller determines the injection interval period of a specific cylinder, before the injector provided to the specific cylinder injects the fuel and after combustion in the last cylinder in a combustion order is finished, based on the injection pressure detected by the injection pressure sensor.

8. The diesel engine system of claim 7, wherein the injector has a nozzle hole used as an outlet of the fuel, and performs the main injection at a timing where an injection axis extending a center axis of the nozzle hole intersects with the lip part, and wherein the injection controller calculates an oxygen arrival timing that is a timing at which a clean airflow with a high oxygen content returns to a specific position on the injection axis after the end of the main injection, based on a plurality of parameters including the injection pressure of the fuel, and determines the injection interval period based on the calculated oxygen arrival timing.

9. The diesel engine system of claim 4, wherein the injector has a nozzle hole used as an outlet of the fuel, and performs the main injection at a timing where an injection axis extending a center axis of the nozzle hole intersects with the lip part, and wherein the injection controller calculates an oxygen arrival timing that is a timing at which a clean airflow with a high oxygen content returns to a specific position on the injection axis after the end of the main injection, based on a plurality of parameters including the injection pressure of the fuel, and determines the injection interval period based on the calculated oxygen arrival timing.

10. The diesel engine system of claim 1, wherein the injector has a nozzle hole used as an outlet of the fuel, and performs the main injection at a timing where an injection axis extending a center axis of the nozzle hole intersects with the lip part, and wherein the injection controller calculates an oxygen arrival timing that is a timing at which a clean airflow with a high oxygen content returns to a specific position on the injection axis after the end of the main injection, based on a plurality of parameters including the injection pressure of the fuel, and determines the injection interval period based on the calculated oxygen arrival timing.

* * * * *